United States Patent
Sinzenich et al.

(10) Patent No.: US 11,021,335 B2
(45) Date of Patent: Jun. 1, 2021

(54) DRIVE MODULE AND LINEAR TRANSPORT SYSTEM

(71) Applicant: Beckhoff Automation GmbH, Verl (DE)

(72) Inventors: Andreas Sinzenich, Steinhagen (DE); Thomas Vorbohle, Rietberg (DE); Uwe Prüßmeier, Lemgo (DE)

(73) Assignee: Beckhoff Automation GmbH, Verl (DE)

(*) Notice: Subject to any disclaimer, the term of this patent is extended or adjusted under 35 U.S.C. 154(b) by 40 days.

(21) Appl. No.: 16/657,594

(22) Filed: Oct. 18, 2019

(65) Prior Publication Data

US 2020/0048016 A1 Feb. 13, 2020

Related U.S. Application Data

(63) Continuation of application No. PCT/EP2018/060073, filed on Apr. 19, 2018.

(30) Foreign Application Priority Data

Apr. 21, 2017 (DE) ...................... 10 2017 108 557.2

(51) Int. Cl.
*H02K 41/02* (2006.01)
*B65G 23/23* (2006.01)
(Continued)

(52) U.S. Cl.
CPC .............. *B65G 54/02* (2013.01); *B65G 23/22* (2013.01); *B65G 23/24* (2013.01); *H02K 5/04* (2013.01); *B65B 35/24* (2013.01); *H02K 41/031* (2013.01)

(58) Field of Classification Search
CPC .......... B65G 23/23; B65G 54/02; H02K 5/04; H02K 41/02
(Continued)

(56) References Cited

U.S. PATENT DOCUMENTS 6,876,107 B2 * 4/2005 Jacobs ................. H02K 11/215
310/12.19
9,008,831 B1 * 4/2015 Jacobs ................... B65G 43/08
700/217
(Continued)

FOREIGN PATENT DOCUMENTS

DE 10 2011 017 525 A1 10/2012
DE 10 2012 103 378 A1 10/2013
(Continued)

OTHER PUBLICATIONS

International Preliminary Report on Patentability dated Feb. 21, 2019 in connection with International Patent Application No. PCT/EP2018/060073, 11 pages including English translation.
(Continued)

*Primary Examiner* — Douglas A Hess
(74) *Attorney, Agent, or Firm* — Dorsey & Whitney LLP

(57) ABSTRACT

A drive module for a linear transport system comprises a housing and a stator, wherein a conveying device of the linear transport system with a magnet arrangement can be arranged on the housing. The stator is arranged in the housing, wherein the stator comprises at least one coil arrangement having at least one coil with at least one stator tooth. The coil arrangement is designed to switchably provide a magnetic traveling field, wherein the magnetic traveling field exits from the coil arrangement at the end faces and passes through the housing shells in order to enter into operative connection with the magnet arrangement of the conveying device of the linear transport system on the outer side of the housing for the purpose of forming a magnetic coupling.

19 Claims, 15 Drawing Sheets

(51) Int. Cl.
*B65G 54/02* (2006.01)
*B65G 23/22* (2006.01)
*B65G 23/24* (2006.01)
*H02K 5/04* (2006.01)
*B65B 35/24* (2006.01)
*H02K 41/03* (2006.01)

(58) Field of Classification Search
USPC .......................................................... 198/619
See application file for complete search history.

(56) References Cited

U.S. PATENT DOCUMENTS

| | | | | |
|---|---|---|---|---|
| 9,032,880 | B2* | 5/2015 | King | B60L 13/003 |
| | | | | 104/281 |
| 9,446,902 | B2* | 9/2016 | Aumann | B65G 54/02 |
| 9,499,357 | B2* | 11/2016 | Aumann | B65G 54/02 |
| 9,511,681 | B2* | 12/2016 | Wernersbach | B65G 54/02 |
| 9,604,795 | B2* | 3/2017 | Aumann | B65G 54/02 |
| 10,351,350 | B2* | 7/2019 | Nara | B65G 35/06 |
| 10,562,720 | B2* | 2/2020 | Yamamoto | B65G 54/02 |
| 10,608,469 | B2* | 3/2020 | Floresta | B60L 5/005 |
| 10,894,675 | B2* | 1/2021 | Hartung | B65G 54/02 |
| 2003/0230941 | A1 | 12/2003 | Jacobs | |
| 2010/0276256 | A1 | 11/2010 | Kleinikkink et al. | |
| 2015/0027860 | A1 | 1/2015 | Kleinikkink et al. | |
| 2016/0164395 | A1 | 6/2016 | Sommerhalter | |

FOREIGN PATENT DOCUMENTS

| | | |
|---|---|---|
| DE | 10 2012 204 916 A1 | 10/2013 |
| EP | 2560904 A1 | 2/2013 |
| WO | 20130143783 A1 | 10/2013 |

OTHER PUBLICATIONS

International Search Report and Written Opinion dated Jun. 13, 2018 in connection with International Patent Application No. PCT/EP2018/060073, 21 pages including English translation.

\* cited by examiner

DRIVE MODULE AND LINEAR TRANSPORT SYSTEM

CROSS REFERENCE TO RELATED APPLICATIONS

This patent application claims the priority of International Patent Appl. No. PCT/EP2018/060073 filed 19 Apr. 2018 and German patent application DE 10 2017 108 557.2, filed Apr. 21, 2017, entitled ANTRIEBSMODUL UND LINEARTRANSPORTSYSTEM, the disclosure content of which is hereby incorporated by reference in the entirety and for all purposes.

FIELD

The invention relates to a drive module and to a linear transport system.

BACKGROUND

DE 10 2012 204 916 A1 discloses a stator apparatus for a linear motor and a linear transport system. The stator apparatus has an electrically energizable magnetic field generator for forming a magnetic field and a first holding device for holding the magnetic field generator. The magnetic field generator is fastened to the first holding device and the first holding device is at least partially formed from an electrically non-conductive and/or magnetically impermeable material.

Furthermore, further linear transport apparatuses are also known from US 2003/0230941 A1, US 2015/0027860 A1, US 2010/0276256 A1, DE 10 2012 103 378 A1 and DE 10 2011 017 525 A1, US 2016/0164395 A1, WO 2013/143783 A1.

Furthermore, EP 2 560 904 B1 discloses is a transport apparatus for delivering a product, wherein the transport apparatus comprises a large number of conveying elements, which can be moved independently of one another, for conveying products, a stationary running rail which is arranged in an encircling manner and defines a running path with at least one running track for the conveying element, and a linear motor drive apparatus for driving the conveying elements, wherein each conveying element has permanent magnets which are operatively connected to coils of the linear drive apparatus, and wherein each conveying element has at least one first partial element and one second partial element which are connected to one another in an articulated manner by joints. Each conveying element has a modular construction and the individual partial elements have an identical basic construction. The transport device has numerous undercuts and gaps and is therefore difficult to clean.

Therefore, for example when the transport apparatus is used in the manufacture of food or the packaging of food, particles of food containing germs can become deposited in the gaps and undercuts. The particles of food serve as a breeding ground for germs in this case. If all of the particles of food cannot be removed during cleaning of the transport device, the transport device can transfer the germs to the further food to be manufactured during the manufacture of the food and infect said food with the germs.

BRIEF SUMMARY

An improved drive module and an improved linear transport system which are particularly easy to clean is provided.

Examples

According to one aspect, a drive module for a linear transport system has a housing and a stator, wherein a conveying device of the linear transport system with a magnet arrangement can be arranged on the housing. The housing comprises a first housing shell and a second housing shell, wherein the first housing shell and the second housing shell together delimit a first housing interior, wherein the stator is arranged in the first housing interior. The stator comprises at least one coil arrangement having at least one coil with at least one stator tooth, wherein the coil arrangement is designed to switchably provide a magnetic traveling field. The stator tooth has a first end face and a second end face which is arranged opposite the first end face, wherein the first end face is arranged on the inner side of the first housing shell and the second end face is arranged on the inner side of the second housing shell, wherein the housing shells cover the stator tooth in relation to a surrounding area. The magnetic traveling field exits from the coil arrangement at the end faces and passes through the housing shells in order to enter into operative connection with the magnet arrangement of the conveying device of the linear transport system on the outer side of the housing for the purpose of forming a magnetic coupling.

According to one further aspect, a linear transport system has a drive module, at least one conveying device and a running rail. The drive module has a housing and a stator, wherein the conveying device system with a magnet arrangement is arranged on the housing, wherein the a stator is located in the housing. The stator comprises at least one coil arrangement having at least one coil with at least one stator tooth, wherein a magnetic traveling field exits from the coil arrangement at the end faces and passes through the housing shells in order to enter into operative connection with the magnet arrangement of the conveying device of the linear transport system on the outer side of the housing for the purpose of forming a magnetic coupling. The running rail is fastened to the drive module, wherein the conveying device comprises a guide arrangement having at least one running roller and at least one magnet arrangement which is arranged offset in relation to the running roller, wherein the running roller bears against the running rail for the purpose of guiding the conveying device along the running rail.

According to one further aspect, a drive module for a linear transport system comprises a housing and a stator, wherein a conveying device of the linear transport system with a magnet arrangement can be arranged on the housing. The stator is arranged in the housing, wherein the stator comprises at least one coil arrangement having at least one coil with at least one stator tooth. The coil arrangement is designed to switchably provide a magnetic traveling field, wherein the magnetic traveling field exits from the coil arrangement at the end faces and passes through the housing shells in order to enter into operative connection with the magnet arrangement of the conveying device of the linear transport system on the outer side of the housing for the purpose of forming a magnetic coupling.

It has been found that a drive module which is easy to clean can be provided by way of the drive module having a housing and a stator, wherein a conveying device of the linear transport system with a magnet arrangement can be arranged on the housing, wherein the housing comprises a first housing shell and a second housing shell, wherein the first housing shell and the second housing shell together delimit a first housing interior, wherein the stator is arranged in the first housing interior, wherein the stator comprises at least one coil arrangement having at least one winding and at least one stator tooth, wherein the stator tooth has a first end face and a second end face which is arranged opposite the first end face, wherein the first end face is arranged on the inner side of the first housing shell and the second end face is arranged on the inner side of the second housing shell, wherein the housing shells cover the stator tooth in relation to a surrounding area, wherein the coil arrangement is designed to switchably provide a magnetic traveling field, wherein the traveling field exits from the coil arrangement at the end faces and passes through the housing shells in order to enter into operative connection with the magnet arrangement of the conveying device of the linear transport system on the outer side of the housing for the purpose of forming a magnetic coupling.

As a result, ingress of aggressive cleaning media, which are used in order to free the drive module of soiling and possibly to disinfect said drive module, into the drive module is avoided. Owing to the improved cleaning options, possibilities of particles, in particular particles of food which can serve as a breeding ground for germs or fungi, being deposited are reliably removed. Furthermore, the transfer of germs to a product which is transported and/or processed and/or packaged using the linear transport system is avoided in this way. Similarly, a situation of particles sticking to the drive module is reduced or avoided, and therefore cleaning intervals for cleaning the drive module are extended in comparison to known drive modules. As a result, the drive module is suitable for use in the food industry or the pharmaceutical industry since high hygiene certification standards can be particularly readily met by the drive module. Furthermore, corrosion of the stator is avoided owing to the housing shells.

In a further embodiment, the first housing shell has a first outer side and the second housing shell has a second outer side, wherein the first outer side and/or the second outer side are of substantially smooth design, wherein the housing has a mean roughness value on the outer side, wherein the mean roughness value lies in a range of from 0.2 µm to 0.8 µm, in particular in a range of from 0.4 µm to 0.8 µm. As a result, the housing can be cleaned in a particularly simple manner. Furthermore, accumulation of dirt and/or particles is reliably avoided owing to the smooth configuration of the outer side.

In a further embodiment, the first housing shell has a first outer side and the second housing shell has a second outer side, wherein the first outer side is arranged in the region of the coil arrangement, wherein the first outer side is of substantially planar design. Furthermore, collection of particles—in particular in difficult-to-clean regions at joints, corners or undercuts—on which germs or fungi can accumulate is avoided.

In a further embodiment, the first housing shell has a first outer side and the second housing shell has a second outer side, wherein the first housing shell has a first coil receptacle, wherein the first coil receptacle has a first coil receptacle base, wherein the first coil receptacle base is arranged between the first outer side and the first end side of the stator tooth and separates the first housing interior from the surrounding area, wherein the first coil receptacle is designed at least in sections in a manner corresponding to the coil, wherein the coil, in particular the stator tooth, engages into the first coil receptacle and may bear against the first coil receptacle base by way of the first end face, wherein the second housing shell has a second coil receptacle which is arranged opposite the first coil receptacle, wherein the second coil receptacle has a second coil receptacle base, wherein the second coil receptacle base is arranged between the second outer side and the second end side of the stator tooth and separates the first housing interior from the surrounding area, wherein the second coil receptacle is designed at least in sections so as to correspond to the coil, in some examples the stator tooth, wherein the coil, in particular the stator tooth, engages into the second coil receptacle and may bear against the second coil receptacle base by way of the second end face. A position of the coil within the first housing interior can be reliably defined in this way. In particular, slipping of the coil can be avoided owing to the engagement into the first coil receptacle. Corrosion on the coil arrangement, particularly on the stator tooth, is avoided in this way.

In a further embodiment, the first coil receptacle and the second coil receptacle are in each case provided for each coil, in particular for each stator tooth. Reliable positioning and fastening of the coil arrangement in the first housing interior are ensured in this way.

In a further embodiment, the coil comprises a winding around the stator tooth and an electrical insulation, wherein the insulation is of plate-like design and has at least one first cutout, wherein the first cutout is designed so as to correspond to the stator tooth, wherein the stator tooth passes through the first cutout, wherein the insulation is arranged at least between one of the two housing shells of the winding and the winding is electrically insulated from the housing.

In a further embodiment, the drive module has a sensor unit for ascertaining a position of the conveying device on the drive module, wherein the first housing shell, on a side averted from the first housing interior, delimits a second housing interior at least in sections. The sensor unit is arranged in the second housing interior. The drive module can be designed in a particularly compact manner in this way.

In a further embodiment, the housing has a covering element. The sensor unit has a sensor. The covering element is arranged on the first outer side of the first housing shell and closes the second housing interior in relation to the surrounding area. The sensor is arranged so as to adjoin the covering element, wherein the covering element may be of film-like design. The covering element may be surface-to-surface bonded to the first outer side. This ensures that the sensor can reliably receive signals of a signal influencer of the conveying device and a position of the conveying device on the drive module can be ascertained on the basis of the detected signal.

In a further embodiment, the first housing interior is filled with a potting compound. The potting compound may be of thermally conductive design in order to dissipate heat from the stator and to cool the stator. The potting compound may comprises a plastic, in particular a thermoset plastic, in particular polyurethane.

In a further embodiment, the housing has an at least one first connecting profile and one second connecting profile for positioning the second housing shell relative to the first housing shell, wherein the first connecting profile is arranged on one housing shell and the second connecting profile is arranged on the other housing shell, wherein the first connecting profile has at least one protrusion and the second connecting profile has a receptacle which is designed so as to correspond to the protrusion, wherein the protrusion extends in the direction of the other housing shell, wherein the protrusion engages into the receptacle and defines a position of the second housing shell relative to the first housing shell at least in a first direction.

In a further embodiment, the first connecting profile has at least one further protrusion and the second connecting profile has a further receptacle which is designed so as to correspond to the further protrusion, wherein the further protrusion is arranged on one housing shell and the further receptacle is arranged on the other housing shell, wherein the further protrusion extends in the direction of the other housing shell, wherein the protrusion and the further protrusion may be designed differently from one another, wherein the receptacle and the further receptacle may be designed differently from one another, wherein the receptacle and the protrusion are arranged on a housing side section of the housing, wherein the further receptacle and the further protrusion are arranged on a further housing side section of the housing, wherein the housing side section and the further housing side section may adjoin one another, wherein the further protrusion engages into the further receptacle and defines a position of the second housing shell relative to the first housing shell at least in a second direction transversely to the first direction. The position of the second housing shell relative to the first housing shell can be reliably defined in a two-dimensional manner in this way.

In a further embodiment, a connector is provided, wherein the connector is arranged on the first protrusion, wherein the connector may be arranged centrally with respect to a maximum extent of a housing side section of the housing that faces the component. In this way, a torque from the component is reliably supported in the housing and bending-up of the housing shell is reliably avoided.

In a further embodiment, the housing has a sealing element, wherein the sealing element is designed to seal off a gap between the drive module and a further component, in particular a further drive module of the linear transport system, wherein the first sealing element may be arranged in an encircling manner on the housing.

Similarly, it has been found that an improved linear transport system can be provided by way of the linear transport system having at least one drive module, at least one conveying device and at least one running rail, wherein the drive module is designed as described above, wherein the running rail is fastened to the drive module, wherein the conveying device comprises a guide arrangement having at least one running roller and at least one magnet arrangement which is arranged offset in relation to the running roller, wherein the running roller bears against the running rail for the purpose of guiding the conveying device along the running rail, wherein the magnet arrangement can be arranged on the outer side of the housing in the traveling field of the stator for the purpose of driving the conveying device.

In a further embodiment, the conveying device has a signal influencer, wherein the signal influencer is arranged on the outer side of the covering element and is designed to provide a signal to the sensor, wherein the sensor is designed to detect the signal and to provide it to the processing unit. The processing unit is designed to ascertain a position of the conveying device on the drive module on the basis of the provided signal. The traveling field can be positioned in a particularly exact manner in this way in order to move the conveying device along the drive module by the traveling field.

In a further embodiment, the linear transport system has a further drive module, wherein the further drive module is designed as described above, wherein the running rail is fastened to the drive module on one side and the further drive module is fastened to a further side of the drive module.

In a further embodiment, the linear transport system has a large number of conveying devices, wherein the conveying devices may be designed identically to one another, wherein the conveying devices are driven by the drive module.

BRIEF DESCRIPTION OF THE DRAWINGS

The invention is explained in greater detail below on the basis of exemplary embodiments with reference to figures, in which.

DETAILED DESCRIPTION

Reference is made hereinafter to a coordinate system 5 in the figures. The coordinate system 5 is configured as a right-handed system and has an x-axis (vertical direction), a y-axis (longitudinal direction) and a z-axis (transverse direction). It goes without saying that the coordinate system 5 can also be configured in a different way.

Figure 1:
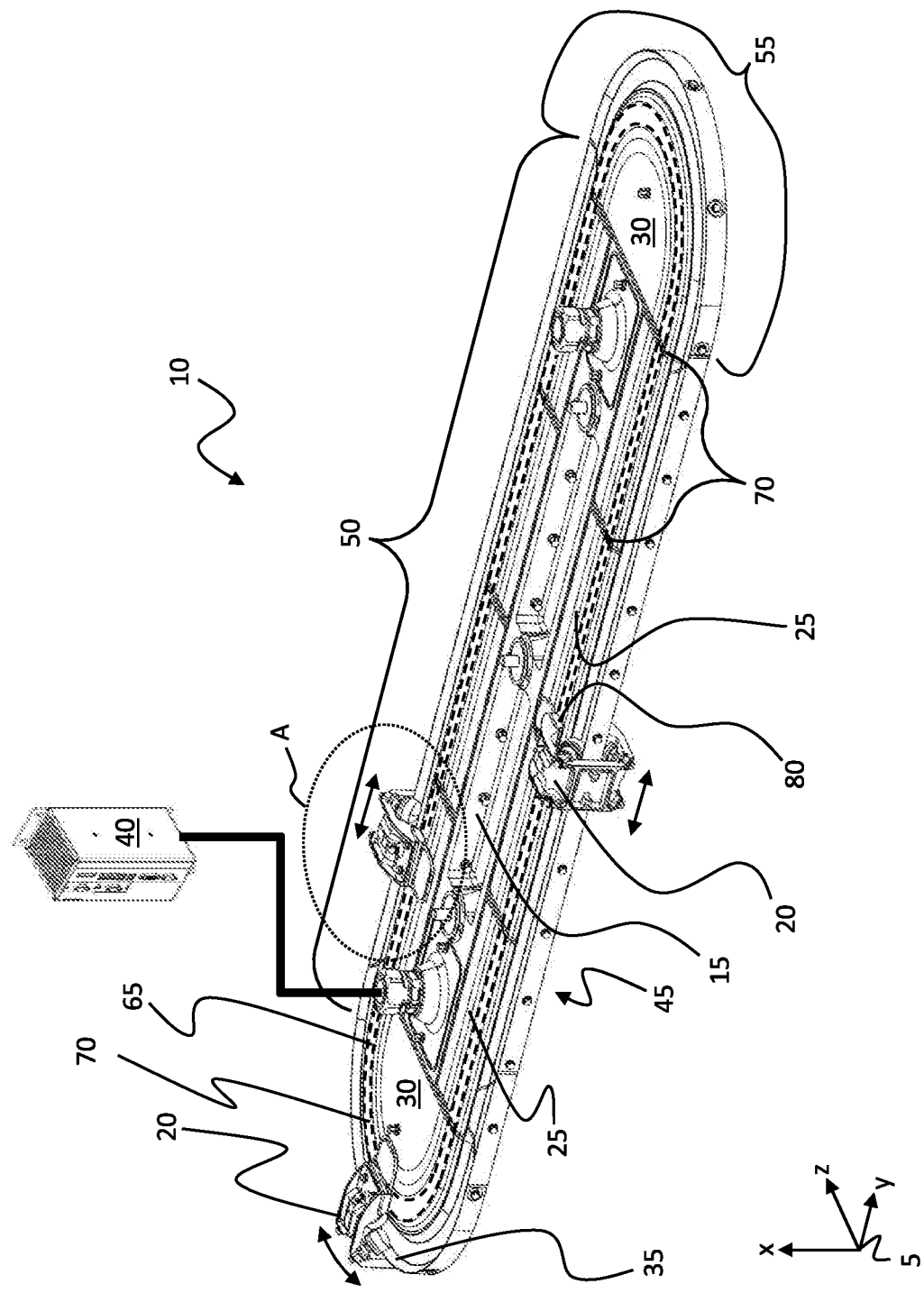
FIG. 1 shows a perspective illustration of a linear transport system.

FIG. 1 shows a perspective illustration of a linear transport system 10.

The linear transport system 10 has a plurality of conveying devices 20 of identical design to one another, a first drive module 25, optionally at least one second drive module 30 and a running rail 35. On the inner side, the drive modules 25, 30 are fastened to a machine bed 15. On the outer side, the running rail 35 is arranged in an encircling manner on the drive modules 25, 30. The conveying device 20 is fastened to the running rail 35 and at least partially engages around the drive module 25, 30.

In the embodiment illustrated here, in each case four first drive modules 25 are arranged next to one another in a row parallel in relation to the y-axis on each side, wherein in each case the second drive module 30 is arranged at a front and rear end of the row of first drive modules 25. This produces a closed, approximately oval shape of the linear transport system 10. It goes without saying that any other desired number of first drive modules 25 and/or second drive modules 30, which are shaped differently and comprise, in particular, only an angular range of 22.5° or 45° or 90° or any desired other angular range, can also be combined to form a linear transport system 10. It is not necessary for said linear transport system 10 to form an encircling closed contour.

In the embodiment, the first drive module 25 and a first running rail section 50, which is arranged on the first drive module 25, extend in the longitudinal direction parallel in relation to the y-axis. A second running rail section 55 is of semicircular design, wherein, in a manner corresponding to the configuration of the second running rail section 55, the second drive module 30 is of semicircular design and arrangement.

The conveying device 20 can be moved in relation to the running rail 35 and the drive module 25, 30. The conveying device 20 is guided in terms of its movement by the running rail 35. In the process, forces, including holding forces for transporting an object on the conveying device 20 for example, are supported by the conveying device 20 on the running rail 35. The forces are supported by the running rail 35 via the drive module 25, 30 on the machine bed 15.

The linear transport system 10 further has a controller 40 and a drive device 45. The controller 40 is connected to the drive modules 25, 30. The drive device 45 is designed as a linear motor, wherein the drive device 45 has a stator 65 (illustrated using dashed lines) and a magnet arrangement 80 for each conveying device 20. The stator 65 has a coil arrangement 70 (illustrated using dashed lines) for each drive module 25, 30. The coil arrangement 70 is oriented parallel in relation to the running rail section 50, 55 which is arranged on the drive module 25, 30 in each case. Therefore, in the first drive module 25, the coil arrangement 70 is oriented so as to run in a straight line parallel in relation to the y-axis and parallel in relation to the first running rail section 50 whereas, in contrast, in the second drive module 30, the coil arrangement 70 is arranged so as to run in an arcuate manner. The coil arrangements 70 are each connected to the controller 40. Each of the coil arrangements 70 has at least one coil 130.

The magnet arrangement 80 is arranged on the conveying device 20. The magnet arrangement 80 is arranged to the side of the stator 65 in each case.

The controller 40 is designed to vary a coil current through a predefined number of coils, that is to say a current flow through the predefined number of coils. The coil current generates a magnetic traveling field which interacts with the magnet arrangement 80.

The controller 40 is designed to control the movement of the conveying device 20 along the running rail 35. In so doing, the controller 40 subjects the coil currents through the coils to open-loop control or closed-loop control in such a way that a force which is directed along the drive module 25, 30 is exerted onto the conveying device 20 by the interaction of the magnet arrangement 80 with the magnetic traveling field which is generated by the coil currents. In this way, each conveying device 20 can carry out a movement which is different from the other conveying device 20, for example a different movement direction and/or acceleration and/or speed.

Figure 2:
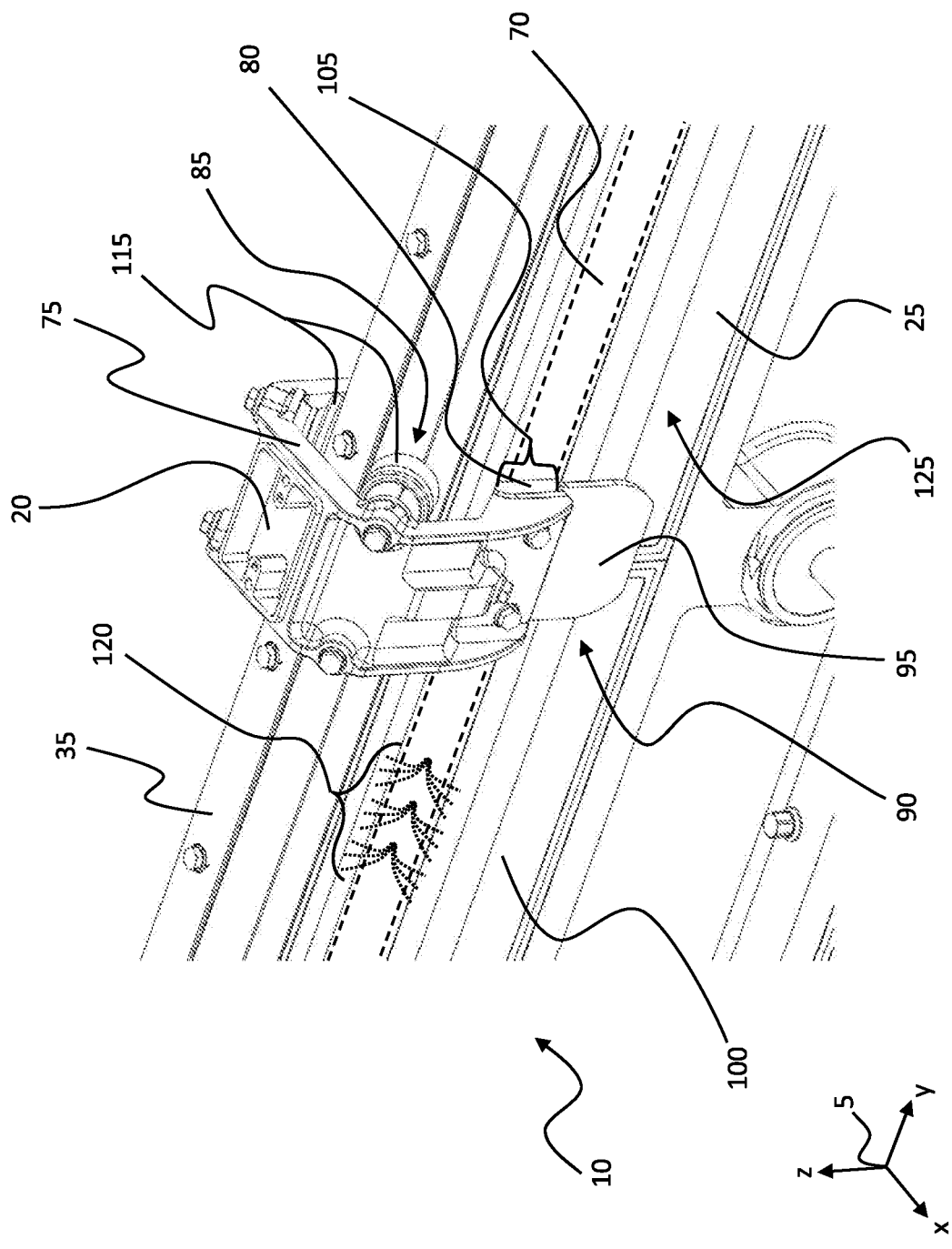
FIG. 2 shows a detail A of the linear transport system shown in FIG. 1.

FIG. 2 shows the detail A of the linear transport system 10 shown in FIG. 1 in a position which is tilted in the direction of the viewer.

The conveying device 20 has a support 75 and a guide arrangement 85. The support 75 is of U-shaped, in particular horseshoe-shaped, design and engages around both the running rail 35 and also an outer-side section of the first drive module 25. The guide arrangement 85 is connected to the support 75 and positions the conveying device 20 on the running rail 35. In the embodiment, the guide arrangement 85 comprises a plurality of running rollers 115 which roll on the running rail 35 and therefore position the conveying device 20 in a relatively displaceable manner in relation to the running rail 35.

In addition, the linear transport system 10 comprises a position detection device 90. The position detection device 90 comprises a signal influencer 95 which is designed as a lug and is arranged at one end of the support 75. The signal influencer 95 is of plate-like design, oriented parallel in relation to a first outer side 100 of the first drive module 25 and extends in a yz-plane. The signal influencer 95 is arranged spaced apart from a first outer side 100 of the first drive module 25. The first outer side 100 is of planar design level with the signal influencer 95.

The magnet arrangement 80 comprises a first magnet arrangement section 105 in a manner laterally adjoining the signal influencer 95. The magnet arrangement 80 comprises a second magnet arrangement section (concealed in FIG. 2 by the running rail 35 and parts of the first drive module 25) on a side which is opposite the first magnet arrangement section 105. The magnet arrangement section 105 is fastened to the support 75 in each case. Each magnet arrangement section 105 can have one or more permanent magnets which are arranged in a row parallel in relation to the first running rail section 50.

In the event of activation by the controller 40, the the controller subjects the coil currents through the coils 130 to open-loop control or closed-loop control in such a way that a force which is directed along the the coil arrangement is exerted onto the conveying device 20 by the interaction of the magnet arrangement 80 with the magnetic traveling field which is generated by the coil currents.

The drive device 45 can be designed, for example, as a synchronous linear motor. In this case, coil currents which form a polyphase AC signal are generated in the coils 130. The number of phases of the AC signal and the mutual phase angle of the individual coil currents are determined here in accordance with the geometry of the arrangement of the coils along the coil arrangement and in accordance with the geometry of the magnet arrangement.

The controller 40 can drive the coil arrangement 70 in such a way that the traveling field 120 is moved. Owing to the coupling of the magnet arrangement 80 to the traveling field 120, the conveying device 20 is carried along in the movement of the traveling field 120.

The drive module 25, 30 comprises a housing 125. The coil arrangement 70 is arranged in the housing 125. The housing 125 comprises at least one of the following first materials: a food-grade material, stainless steel, in particular a V4A steel plastic, polyethylene, polytetrafluoroethylene.

The housing 125 is configured on the outer side in such a way that the housing 125 is of substantially smooth design. Here, undercuts, (sharp-edged) joints, recesses or the like on the outside of the housing 125 are dispensed with, so that accumulations of soiling, for example food residues, can be particularly easily removed from the housing 125. A particularly hygienic first drive module 25 which can be used, in particular, for manufacturing food in the food industry is provided in this way.

Figure 3:
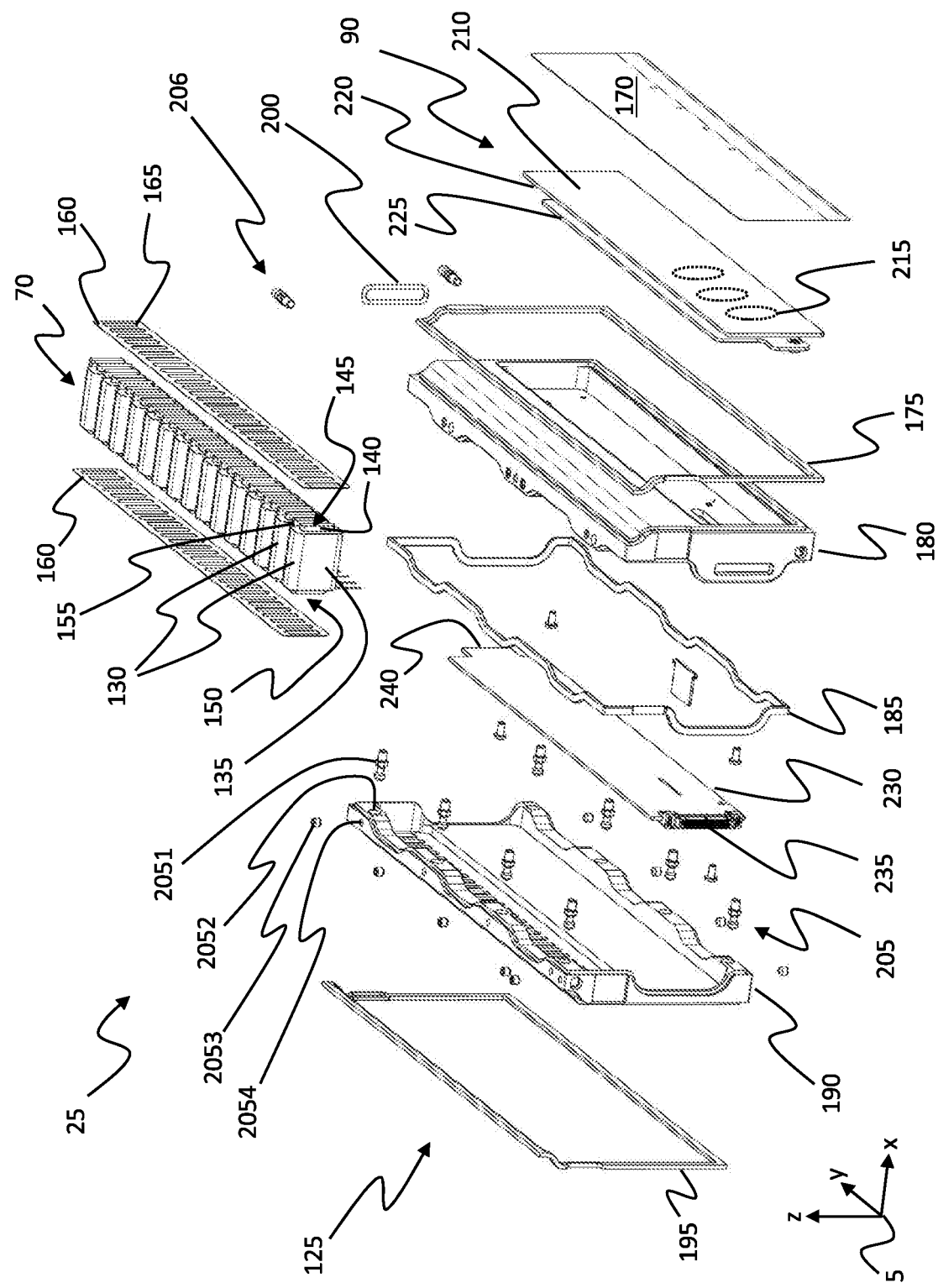
FIG. 3 shows an exploded illustration of a first drive module of the linear transport system shown in FIGS. 1 and 2.

FIG. 3 shows an exploded illustration of the first drive module 25 of the linear transport system 10 shown in FIGS. 1 and 2.

In the embodiment, the coil arrangement 70 of the first drive module 25 has a large number of coils 130 which are arranged next to one another in a row parallel in relation to the y-axis, and therefore parallel in relation to the first running rail section 55. Each coil 130 has a winding 135 and at least one stator tooth 140. A number of the windings 135 can be identical to or different from a number of stator teeth 140. The winding 135 is arranged on the circumference around the the stator tooth 140. The coils 130 are arranged over the length of the first drive module 25 over which the conveying device can be moved during operation of the linear transport system 10. In the illustrated exemplary embodiment, the coils 130 are arranged such that they do not overlap. Here, the coils 130 are arranged next to one another at a regular distance from one another in each case. However, in other exemplary embodiments, the coils 130 can also be arranged such that they overlap.

The stator tooth 140 has in each case one first end face 145 and one second end face 150 which is arranged opposite the first running rail section 55 in the transverse direction.

The first end face 145 and the second end face 150 are arranged parallel in relation to one another. The coil arrangement 70 additionally comprises a further stator tooth 155 between two adjacent coils 130. The further stator tooth 155 is of identical design to the stator tooth 140. The further stator tooth 155 likewise has the first and the second end face 145, 150, wherein the first end face 145 of the further stator tooth 155 is arranged level with the first end face 145 of the stator tooth 140 in the transverse direction. Similarly, the second end face 150 of the further stator tooth 155 is arranged level with the second end side 150 of the stator tooth 140 in the transverse direction. There is no winding 135 wound around the further stator tooth 155.

Electrical energy for generating the traveling field can be applied by the controller 40 to each of the windings 135 separately. The traveling field 120 is directed through the stator tooth 140, 155 and exits from the coil arrangement 70 out of the end faces 145, 150.

An electrical insulation 160 of plate-like design is provided at the end side so as to adjoin the coil 130, wherein the insulation 160 has at least one first cutout 165, wherein the first cutout 165 is designed so as to correspond to the stator tooth 140, 155. The stator tooth 140, 155 passes through the insulation 160. A number of the first cutouts 165 provided is identical to a sum of the number of stator teeth 140 and of the further stator teeth 155. The insulation 160 is provided on either side of the windings 135 and, in the mounted state, arranged between the winding 135 and the housing shell 180, 190. The insulation 160 electrically insulates the winding 135 from the housing 125

The housing 125 has a covering element 170, a first sealing element 175, a first housing shell 180, a second sealing element 185, a second housing shell 190, a third sealing element 195 and a fourth sealing element 200. In addition, the housing 125 has a first connector 205 in order to connect the first housing shell 180 to the second housing shell 190 and a second connector 206 in order to connect the first drive module 25 to the further first drive module and/or to the second drive module. In the illustrated exemplary embodiment, the first connector 205 consists of connecting bolts 2051 which are screwed into the first housing shell 180 and engage into corresponding bores 2052 which are correspondingly formed in the second housing shell 190. For the purpose of connecting the two housing shells 180, 190, associated threaded pins 2053 are screwed into correspondingly arranged screw holes 2054 in the transverse direction to the longitudinal extent of the connecting bolt 2051, said threaded pins engaging into a trepan of the connecting bolt 2051 and thereby preventing the housing shells 180, 190 from becoming detached in the longitudinal extent of the connecting bolt 2051. The second connector 206 is constructed essentially identically to the first connector 205 and connects two adjacent drive modules 25 to one another. In a deviation therefrom, the connecting bolt 2051 of the second connector 206 is designed to be longer than the connecting bolt 2051 of the first connector 205.

The position detection device 90 comprises, in addition to the signal influencer, a sensor unit 210 having at least one sensor 215, one sensor printed circuit board 220 and one processing unit 225. The sensor 215 is arranged on the sensor printed circuit board 220. The sensor 215 can have at least one sensor winding. The processing unit 225 is arranged at a distance from the sensor printed circuit board 220 and is electrically connected to the sensor 215 by the sensor printed circuit board 220.

The sensor 215 performs detection during positioning of the signal influencer 95 in the vicinity of the sensor 215. The processing unit 225 ascertains a position of the signal influencer on the first drive module 25 on the basis of the sensor signal and provides this to the controller.

The first drive module 25 further comprises a driver unit 230. The driver unit 230 has a first interface 235 and a second interface 240. The first interface 235 is arranged opposite the second interface 240 in the longitudinal direction. Here, in the embodiment, the first interface 235 is designed as a socket contact whereas, in contrast, the second interface 240 is designed as a plug contact. The first interface 235 serves to provide an electrical connection to the second interface of the adjacent drive module.

The driver unit 230 is further electrically connected to each of the windings 135 and to the controller. Here, the driver unit 230 serves to drive the windings 135 to generate the traveling field on the basis of a control signal of the controller. The controller ascertains the control signal on the basis of the position of the signal influencer on the drive module.

Figure 4:
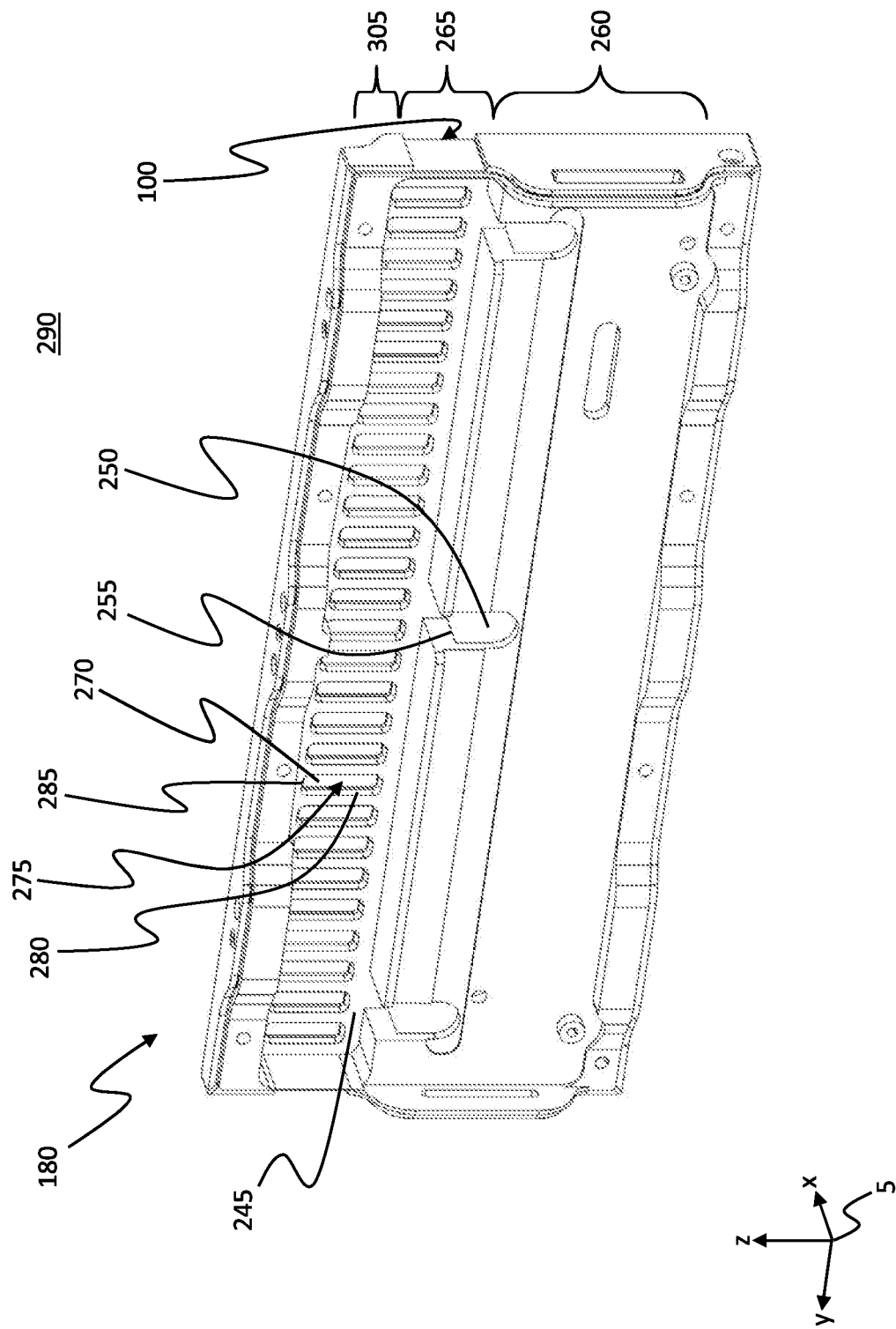
FIGS. 4 to 7 show perspective illustrations of a first housing shell of the first drive module shown in FIG. 3.

FIG. 4 shows a perspective illustration of the first housing shell 180 of the first drive module 25.

The first housing shell 180 has the first outer side 100 and delimits a first housing interior 245, which is arranged on a side facing the viewer, and a second housing interior 250, which is arranged on a side of the first housing shell 180 that is averted from the viewer. The first housing interior 245 is fluidically connected to the second housing interior 250 by a second cutout 255 which is formed in the first housing shell 180.

The first housing shell 180 has a first housing section 260, a second housing section 265 and a third housing section 305. The housing sections 260, 265, 305 extend substantially in two dimensions in the transverse direction and in the longitudinal direction.

The first housing section 260 is arranged offset in relation to the second housing section 265 and the third housing section 305 in the transverse direction and is connected to the second housing section 265, so that the first housing shell 180 has a stepped configuration. The first housing section 260 and the second housing section 265 extend in yz-planes which are each arranged in parallel. The first outer side 100 is arranged on the rear side of the second housing section 265 and the third housing section 305 in FIG. 4.

The first housing interior 245 is delimited from the second housing interior 250 in the transverse direction by the first to third housing section 260, 265, 305.

In the second housing section 265, the first housing shell 180 has a first coil receptacle 270 on a side facing the first housing interior 245. The first coil receptacle 270 is arranged so as to correspond to the arrangement of the stator tooth. A plurality of first coil receptacles 270, which are provided so as to correspond to the number of stator teeth, may be arranged in the second housing section 265.

The first coil receptacle 270 has a first coil receptacle base 275, a first coil receptacle side face 280 and a first coil receptacle opening 285. The first coil receptacle base 275 separates the first housing interior 245 from a surrounding area 290.

The first coil receptacle side face 280 has a cross section which is designed so as to substantially correspond to the stator tooth 140, 155. It may be particularly advantageous that the first coil receptacle side face 280 tapers from the first coil receptacle opening 285 toward the first coil receptacle base 275 at least in sections.

Figure 5:
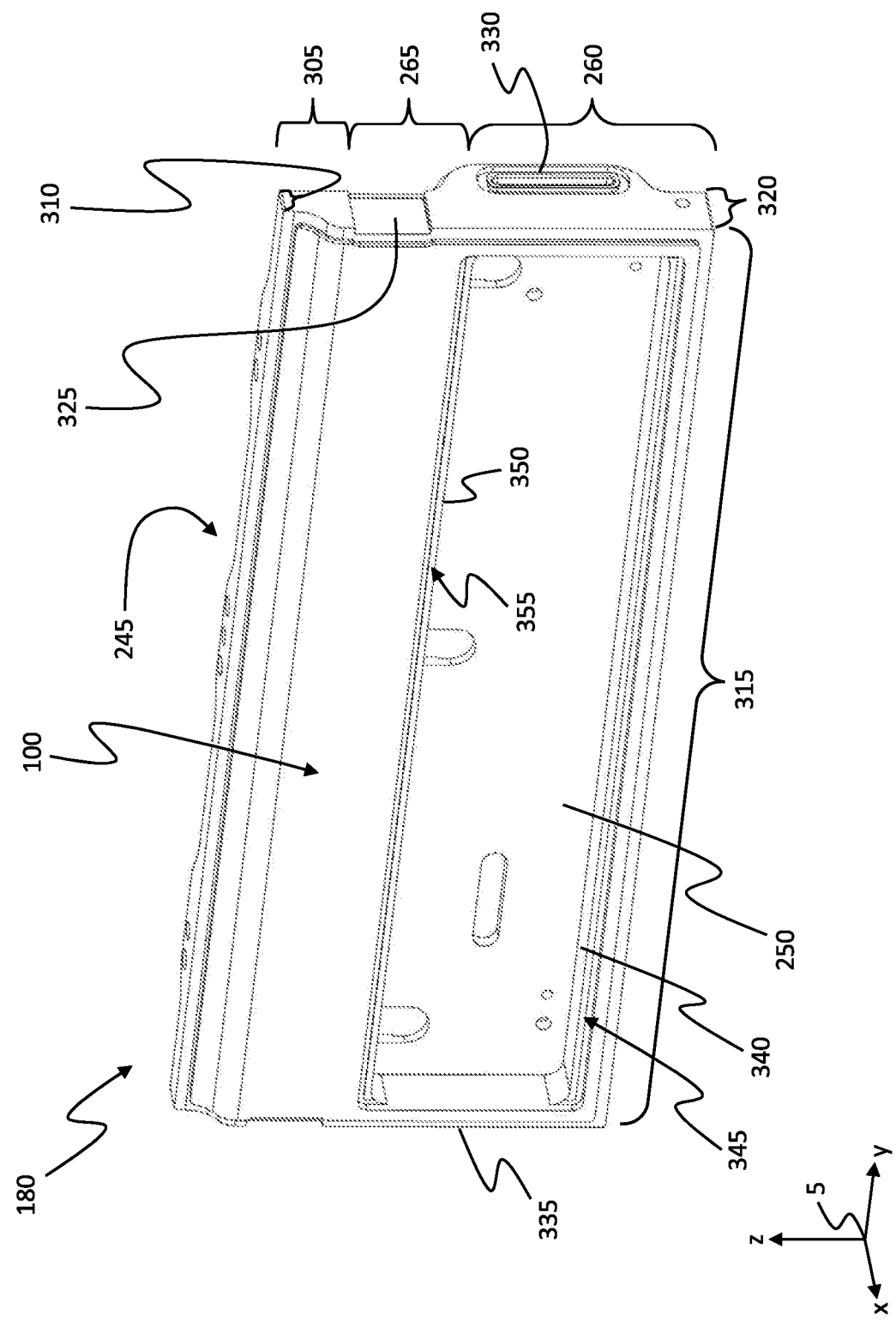

FIG. 5 shows a further perspective illustration of the first housing shell 180 shown in FIGS. 3 and 4.

The third housing section 305 is arranged on a side of the second housing section 265 that is averted from the first housing section 260, and is connected to the second housing section 265. The third housing section 305 tapers to an increasing extent away from the first housing interior 245 in the transverse direction.

The first housing section 260 delimits the second housing interior 250 on that side averted from the first housing interior 245. The second housing interior 250 serves to receive the sensor unit and the processing unit.

The first housing shell 180 further has a first to fourth housing side section 310, 315, 320, 335. The housing sections 310, 315, 320, 325 extend on a common side of the housing section 260, 265, 305 and are oriented in a rectangular manner in relation to one another The first housing side section 310 is arranged so as to adjoin the third housing section 305 on a side averted from the second housing section 265, is connected to the third housing section 305 and is oriented perpendicularly in relation to the first and second housing section 260, 265. The first housing side section 310 extends in the longitudinal direction substantially over an entire longitudinal extent of the first housing shell 180 and delimits the first housing interior 245 at the sides. Furthermore, the first housing side section 310 is oriented parallel in relation to the running rail.

The first housing shell 180 has the second housing side section 315 opposite the first housing side section 310 in the transverse direction. The second housing side section 315 adjoins the first housing section 260 on a side averted from the second housing section 265, is connected to the first housing section 260 and is oriented perpendicularly in relation to the first and second housing section 260, 265. The second housing side section 315 extends in the longitudinal direction over the entire longitudinal extent of the first housing shell 180 and delimits the first housing interior 245 and the second housing interior 250 at the sides. The first housing side section 310 and the second housing side section 315 are oriented in parallel.

The third housing side section 320 is oriented perpendicularly in relation to the housing section 260, 265 and in relation to the first and/or second housing side section 310, 315 and is connected to the housing sections 260, 265, 305 and the first and the second housing side section 310, 315. The third housing side section 320 delimits the first and second housing interior 245, 250 at the first housing section 260 and the first housing interior 245 at the second and third housing section 265, 305 in the longitudinal direction (on a side averted from the viewer in FIG. 5). Furthermore, a groove 325 and also a third cutout 330 are provided in the third housing side section 320. The third cutout 330 serves to receive the first interface and is surrounded by a groove which is of analogous design to the cutout 330 and in which the fourth sealing element 200, illustrated in FIG. 3, is arranged in the assembled state of the linear transport system. Here, the third cutout 330 is designed so as to correspond to the first interface 235. The groove 325 extends over the entire height of the third housing side section 320 and is designed so as to correspond to a first side of the further stator tooth. A further stator tooth is arranged in the groove 325 in the assembled state of the linear transport system.

The first housing shell 180 has the fourth housing side section 335 opposite the third housing side section 320 in the longitudinal direction. The fourth housing section is connected to the housing sections 260, 265, 305 and the first and second housing side section 310, 315. The fourth housing side section 335 delimits the first and second housing interior 245, 250 at the first housing section 260 in the longitudinal direction and the first housing interior 245 at the second and third housing section 265, 305 (on a side averted from the viewer in FIG. 5). In the embodiment, the fourth housing side section 335 and the third housing side section 320 are oriented parallel in relation to one another and are oriented perpendicularly in relation to the first housing side section 310 and the second housing side section 315.

A first shoulder 340 is provided on the second housing side section 315. The first shoulder 340 has a first bearing face 345. The first bearing face 345 is arranged between the first outer side 100 and the first housing section 260 in the transverse direction. The first bearing face 345 is oriented parallel in relation to the first outer side 100 and the first housing section 260.

The first housing shell 180 has a second shoulder 350 for the purpose of connecting the first housing section 260 to the second housing section 265. The second shoulder 350 has a second bearing face 355 which is arranged on a side of the second shoulder 350 that faces the first outer side 100, wherein the second bearing face 355 and the first bearing face 345 are arranged in a common yz-plane. In order to provide a first housing interior 245 which is particularly long in the longitudinal direction, the arrangement of a shoulder on the third housing side section 320 and/or on the fourth housing side section 335 is dispensed with.

Figure 6:
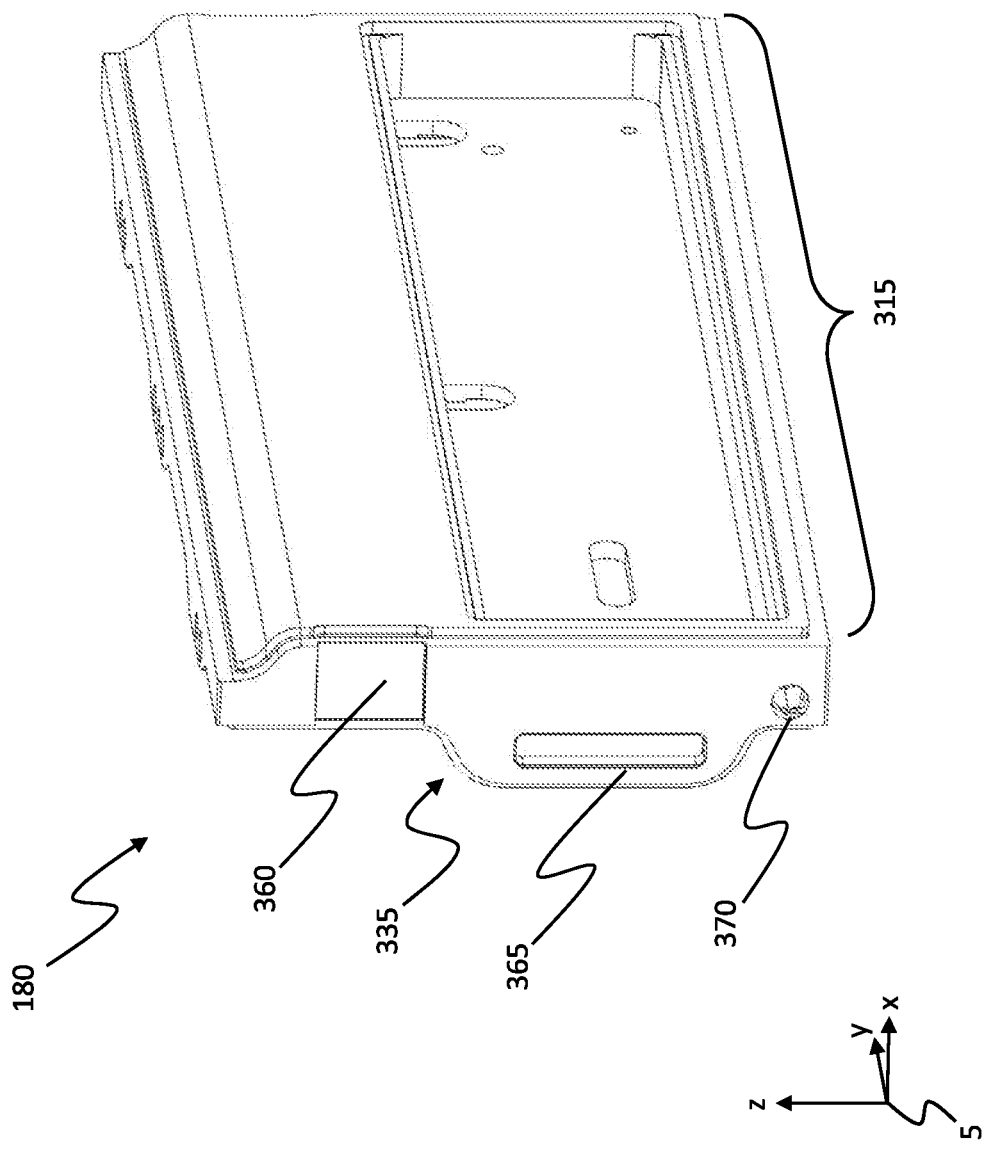

FIG. 6 shows a further perspective illustration of the first housing shell 180 of the first drive module 25 shown in FIG. 3.

Furthermore, a further groove 360 is arranged on the fourth housing side section 335, wherein the further groove 360 is designed so as to correspond to a second side of a further stator tooth. The further groove 360 may be advantageously arranged level with the groove 325 in the z-direction. The further groove 360 and the groove 325 delimit a groove space, in which an individual further stator tooth 155 is arranged, given a correct orientation of the first drive module on the second drive module.

Furthermore, a fourth cutout 365 is provided on the fourth housing side section 335. The fourth cutout 365 is designed so as to correspond to the first and/or second interface 235, 240. The first interface is pushed into the second interface through the fourth cutout 365.

Furthermore, a bolt receptacle 370 is provided on the fourth housing side section 335, wherein the bolt receptacle 370 is arranged between the fourth cutout 365 and the second housing side section 315 in the vertical direction. In the assembled state of the linear transport system 10, the connecting bolt of the second connector 206 engages into the bolt receptacle 370 in order to connect the drive modules to one another. The fourth cutout 370 can also be arranged on the third housing side section.

Figure 7:
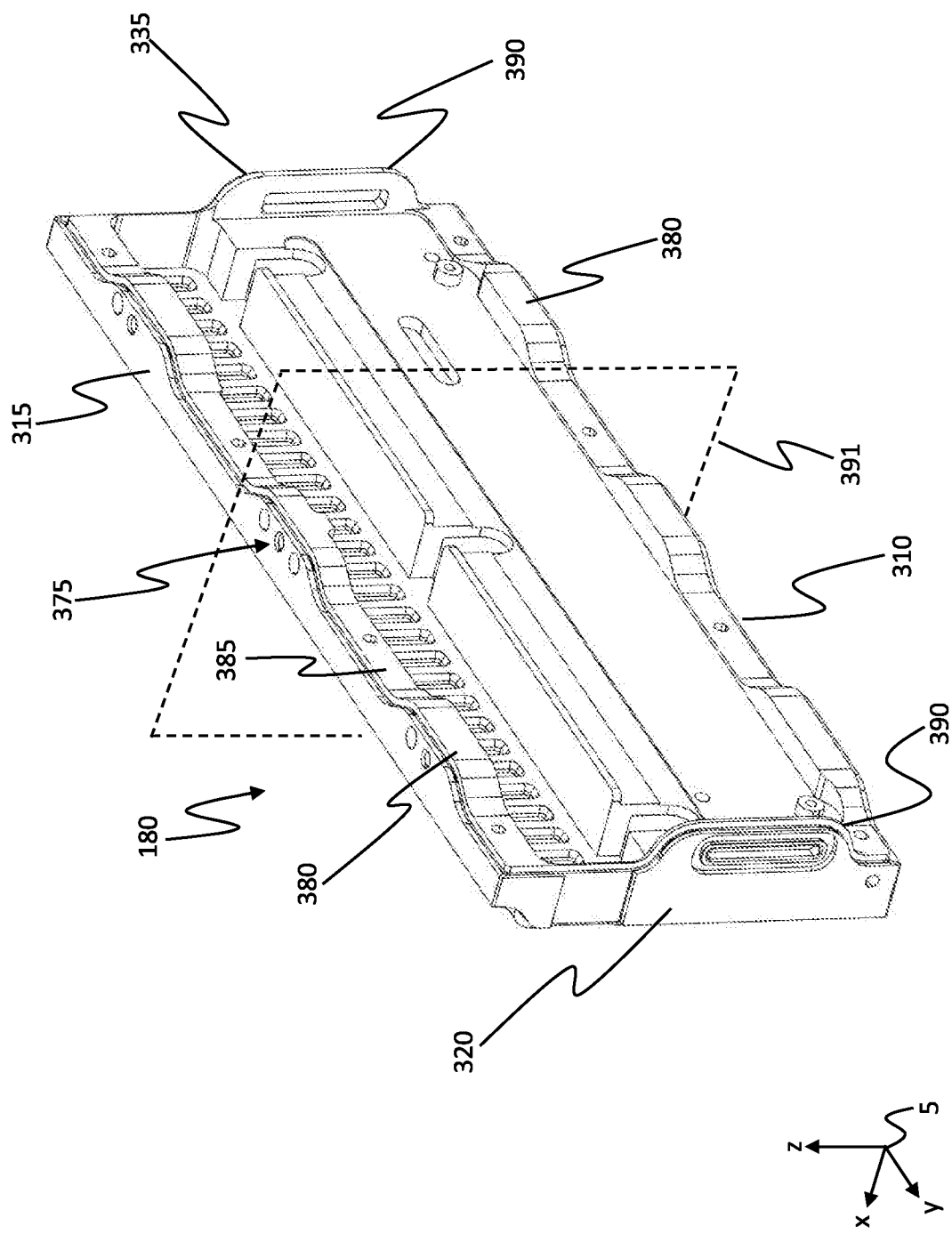

FIG. 7 shows a further perspective illustration of the first housing shell 180.

In order to reliably position the first housing shell 180 relative to the second housing shell, the housing 125 has a first connecting profile 375 on the first housing shell 180. The first connecting profile 375 has a plurality of first protrusions 380, which are arranged at a distance from one another in the longitudinal direction and extend in the vertical direction, on the first housing side section 310 and on the second housing side section 315. The first protrusion 380 has a trapezoidal cross section. The first protrusions 380 are arranged at a regular distance. Furthermore, the first connecting profile 375 further has a first receptacle 385 between two adjacent first protrusions 380.

The first connecting profile 375 additionally has a second protrusion 390. In the embodiment, in each case one second protrusion 390 is provided on the third housing side section 320 and on the fourth housing side section 335 with mirror-image symmetry in relation to a plane of symmetry 391 which is arranged centrally as an xz-plane between the third housing side section 320 and the fourth housing side section 335. The second protrusion 390 is designed differently from the first protrusion 380. The second protrusion 390 extends in the transverse direction and is arranged perpendicularly in relation to the first outer side.

Figure 8:
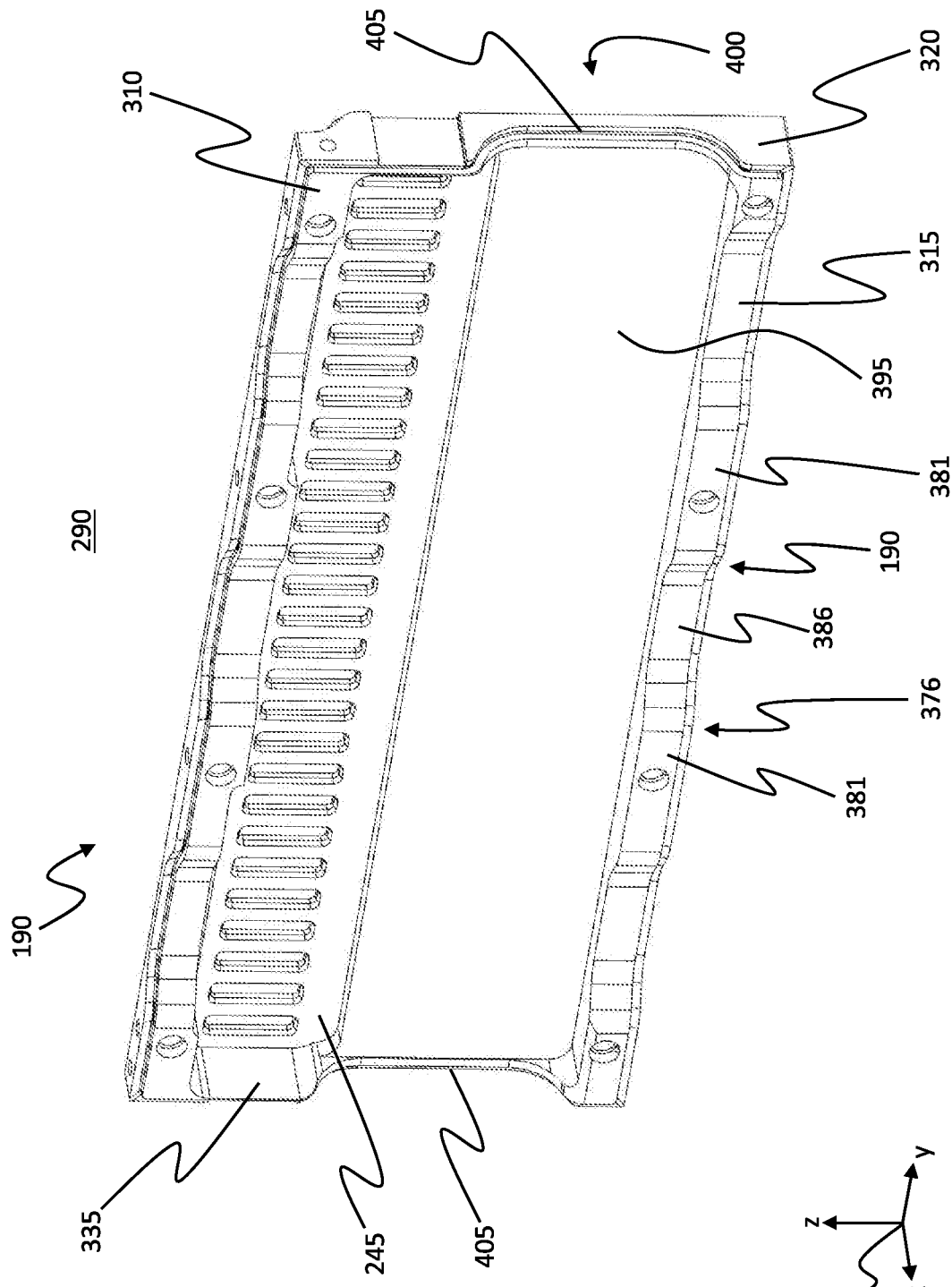
FIG. 8 shows a perspective illustration of a second housing shell of the first drive module shown in FIG. 3.

FIG. 8 shows a perspective illustration of the second housing shell 190 of the first drive module shown in FIG. 3.

The second housing shell 190 serves to close the first housing interior 245 from the surrounding area 290 and at the same time reliably fix the coil arrangement in the first housing interior 245.

The second housing shell 190 has a cover section 395 which has a second outer side 400 on the outer side. The cover section 395 extends substantially in a yz-plane and is oriented parallel in relation to the first and second housing section.

The first to fourth housing side section 310, 315, 320, 335 is in each case arranged on the side of the cover section 395 and connected to the cover section 395 on one of the two sides of the cover section 395. The first to fourth housing side section 310, 315, 320, 335 of the second housing shell 190 are each arranged in alignment with the first to fourth housing side section of the first housing shell.

The second housing shell 190 has a second connecting profile 376 which is designed so as to correspond to the first connecting profile. The second connecting profile 376 has a third protrusion 381 and a second receptacle 386 on the second housing shell 190 both on the first and also on the second housing side section 310, 315, wherein the second receptacle 386 is arranged between two third protrusions 381.

The third protrusion 381 is designed so as to correspond to the first receptacle which is arranged on the first housing shell. Furthermore, the second receptacle 386 which is arranged on the second housing shell 190 is designed so as to correspond to the first housing shell 180 arranged first protrusion. Furthermore, in the longitudinal direction and in the transverse direction, the third protrusion 381 on the second housing shell 190 is oriented in alignment with, that is to say in each case opposite in the y-direction and in the z-direction, the first receptacle on the first housing shell and the second receptacle 386 on the second housing shell 190 is oriented in alignment with the first protrusion on the first housing shell.

In addition, the second connecting profile 376 has a third receptacle 405 on the third housing side section 320 and on the fourth housing side section 335 in each case. The third receptacle 405 is designed so as to correspond to the second protrusion on the first housing shell. It goes without saying that the second protrusion 390 can be arranged on the second housing shell 190 and the third receptacle 405 can be arranged on the first housing shell 180 as well. The third receptacle 405 is in each case arranged in alignment with the second protrusion on the third housing side section and the fourth housing side section of the first housing shell.

Figure 9:
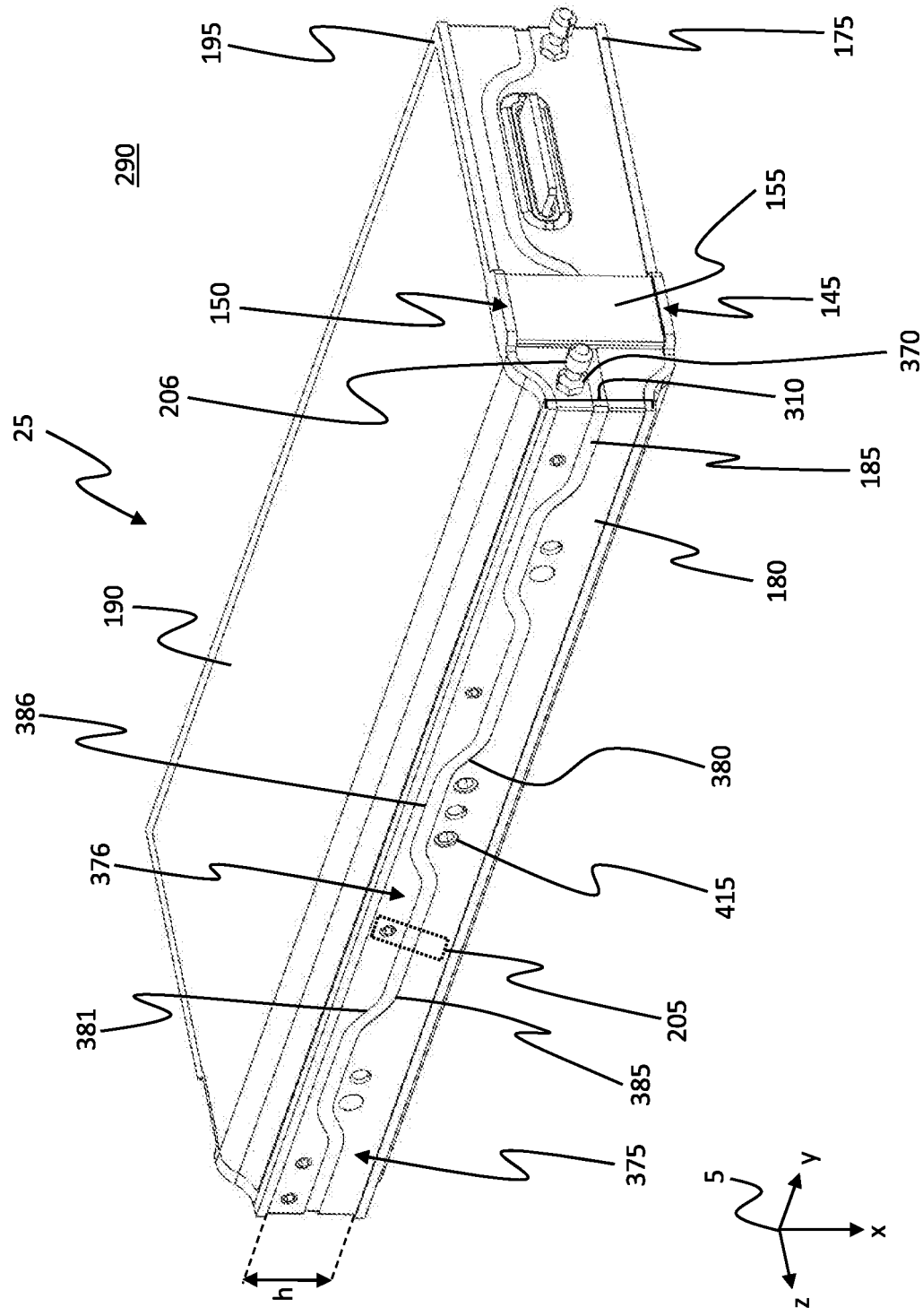
FIG. 9 shows a perspective view of the first drive module.

FIG. 9 shows a perspective view of the first drive module 25.

In the assembled state, the first connecting profile 375 and the second connecting profile 376 engage one in the other. Here, the first protrusion 380 engages into the second receptacle 386. Furthermore, the third protrusion 381 engages into the first receptacle 385. Shifting of the first housing shell 180 in relation to the second housing shell 190 in the longitudinal direction is avoided in this way. The second sealing element 185 is arranged between the first housing shell 180 and the second housing shell 190 for the purpose of sealing off the housing interior from the surrounding area 290. It may be particularly advantageous here when the second sealing element 185 is of encircling design.

It may be particularly advantageous when at least one threaded bore 415, into which a further connecting element can be fastened in order to fasten the running rail to the first drive module 25, is arranged centrally with respect to a maximum height h of the first housing side section 310 in the first protrusion 380 of the first housing shell 180.

Reliable support of the running rail 35 on the first drive module 25 is ensured owing to the central arrangement with respect to a maximum height h of the first housing side section 310. In particular, the second housing shell 190 can be of particularly thin-walled design in this way, so that the second housing shell 190 is particularly cost-effective and lightweight. The forces from the first housing shell 180 are supported via the first housing shell 180 on the rear side on the machine bed.

The first housing shell 180 may be connected to the second housing shell 190 by the first connector 205, wherein the first connector 205 may be advantageously arranged level with the third protrusion 381 and the first receptacle 385 in the longitudinal direction.

The further stator tooth 155 is arranged in the groove 235, wherein the end faces 145, 150 of the further stator tooth 155 are overlapped by the first sealing element 175 and the third sealing element 195.

Figure 10:
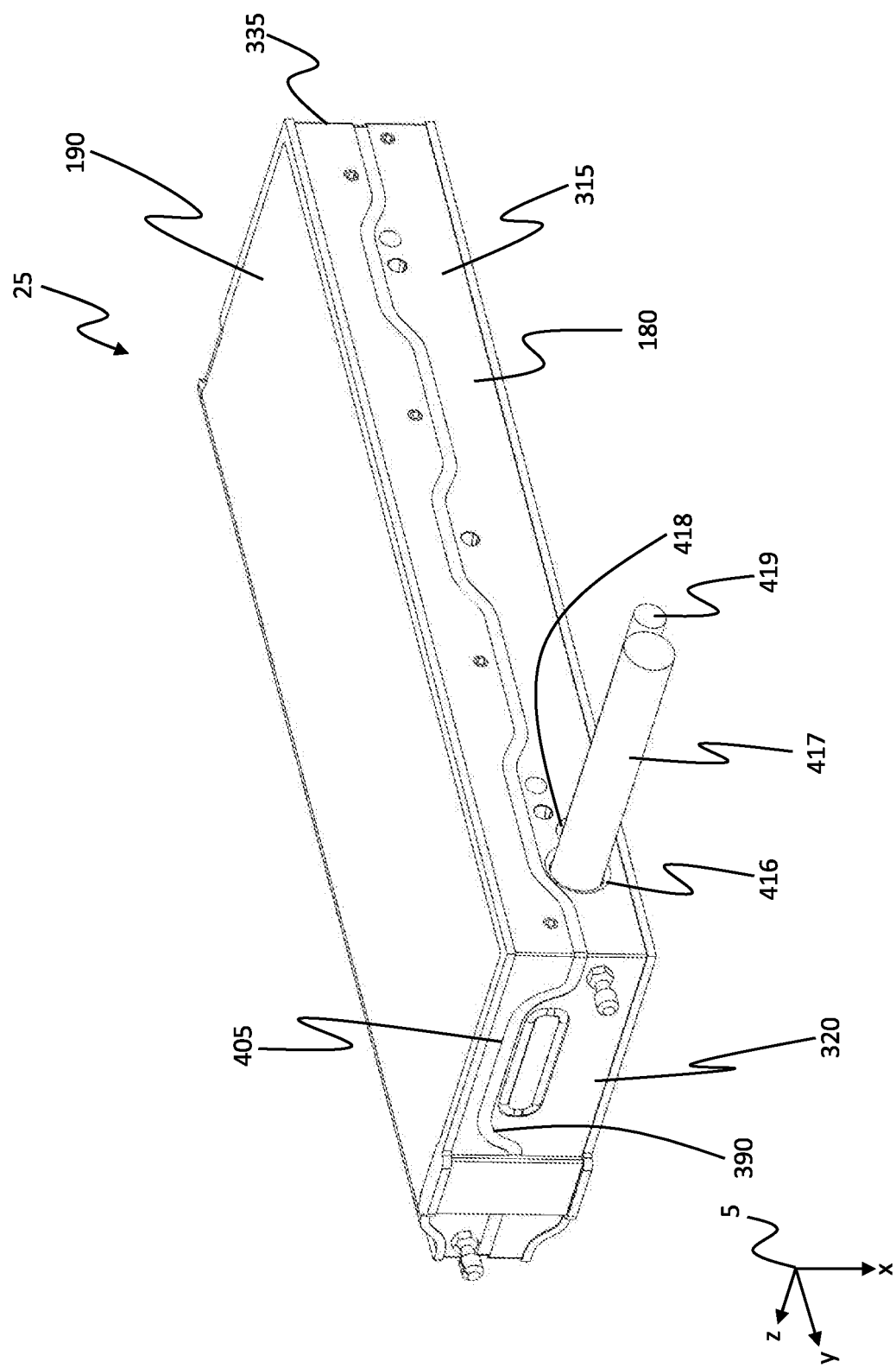
FIGS. 10 to 11 show perspective views of the first drive module in a second embodiment.

FIG. 10 shows a perspective illustration of the first drive module 25 in a second embodiment.

The second protrusion 390 engages into the third receptacle 405 on the third and fourth housing side section 320, 335. Shifting of the first housing shell 180 in relation to the second housing shell 190 in a second direction is avoided in the embodiment of the transverse direction in this way. Therefore, it is ensured that, when the second housing shell 190 is mounted on the first housing shell 180, both the second housing shell 190 is reliably positioned in relation to the first housing shell 180 and at the same time, when the second housing shell 190 is connected to the first housing shell 180, the second housing shell 190 cannot slip in relation to the first housing shell 180.

In the second embodiment of the drive module 25 illustrated here, a first bushing 416 is provided in the first housing shell 180 in the second housing side section 315, a power supply 417 being guided from the machine bed into the first drive module 25 through said first bushing. Furthermore, in addition to the first bushing 416, a second bushing 418 through which a data connection 419 is guided into the drive module 25 is provided. Furthermore, the second housing section 315 can be fastened to the machine bed.

Figure 11:
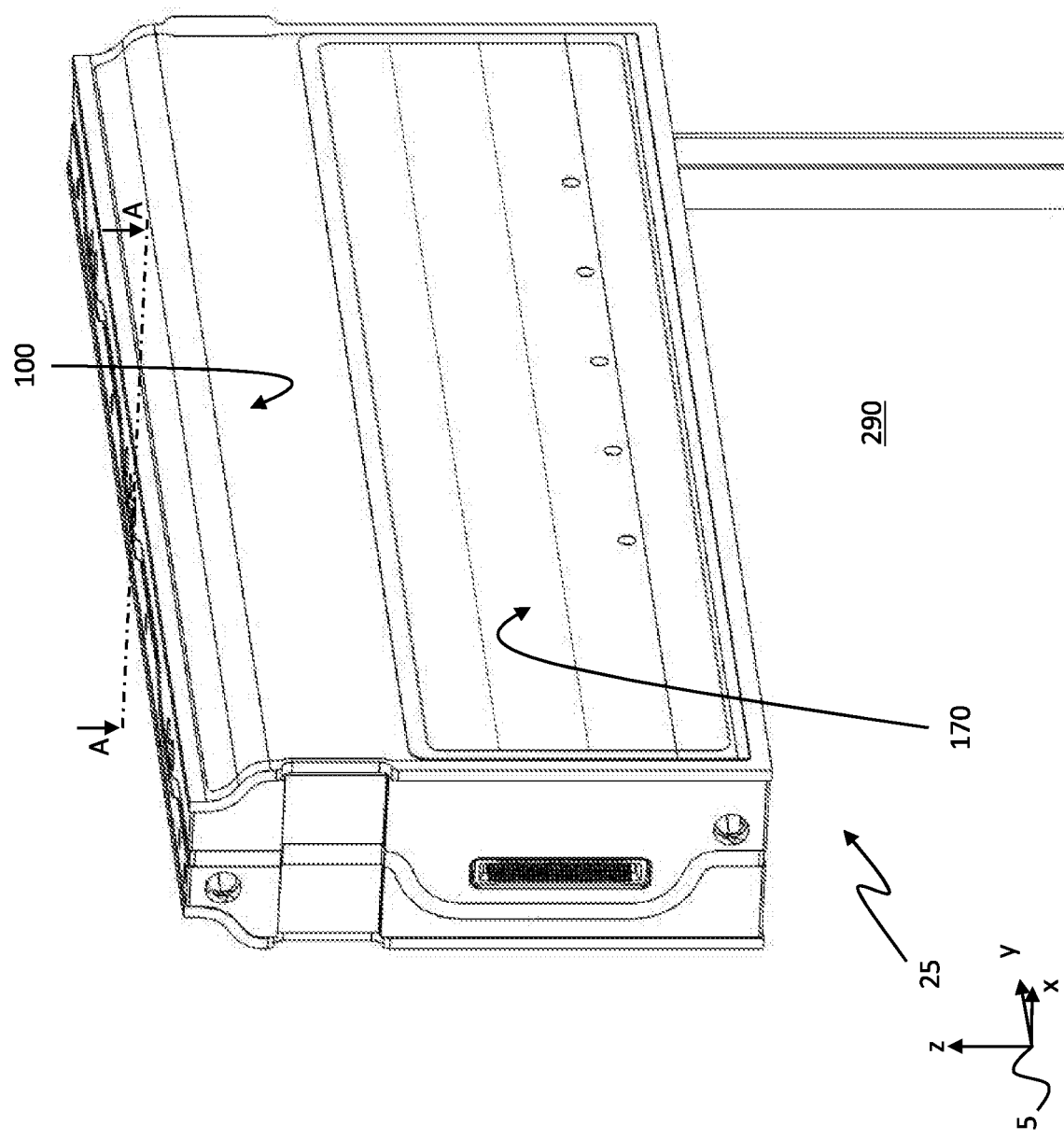

FIG. 11 shows a further perspective view of the first drive module 25 illustrated in FIG. 10.

The covering element 170 is arranged on the first outer side 100. The covering element 170 closes the second housing interior, which is arranged on the bottom side below the covering element 170, from the surrounding area 290.

The covering element 170 is of film-like design. Here, the covering element 170 is surface-to-surface bonded to the first outer side 100 by an adhesive layer.

It may be particularly advantageous when the covering element 170 together with the adhesive layer has a wall thickness of approximately 200 to 500 µm, particularly advantageously a wall thickness of 300 to 350 µm. It may be particularly advantageous when the covering element 170 comprises a second material which is resistant to media, in particular to greases and oils, water and/or acids and/or bases. It may be particularly advantageous when the second material comprises polyester and/or Autotex EBA. In addition, the covering element 170 can have a coating layer in order to match the visual appearance of the first drive module 25.

Figure 12:
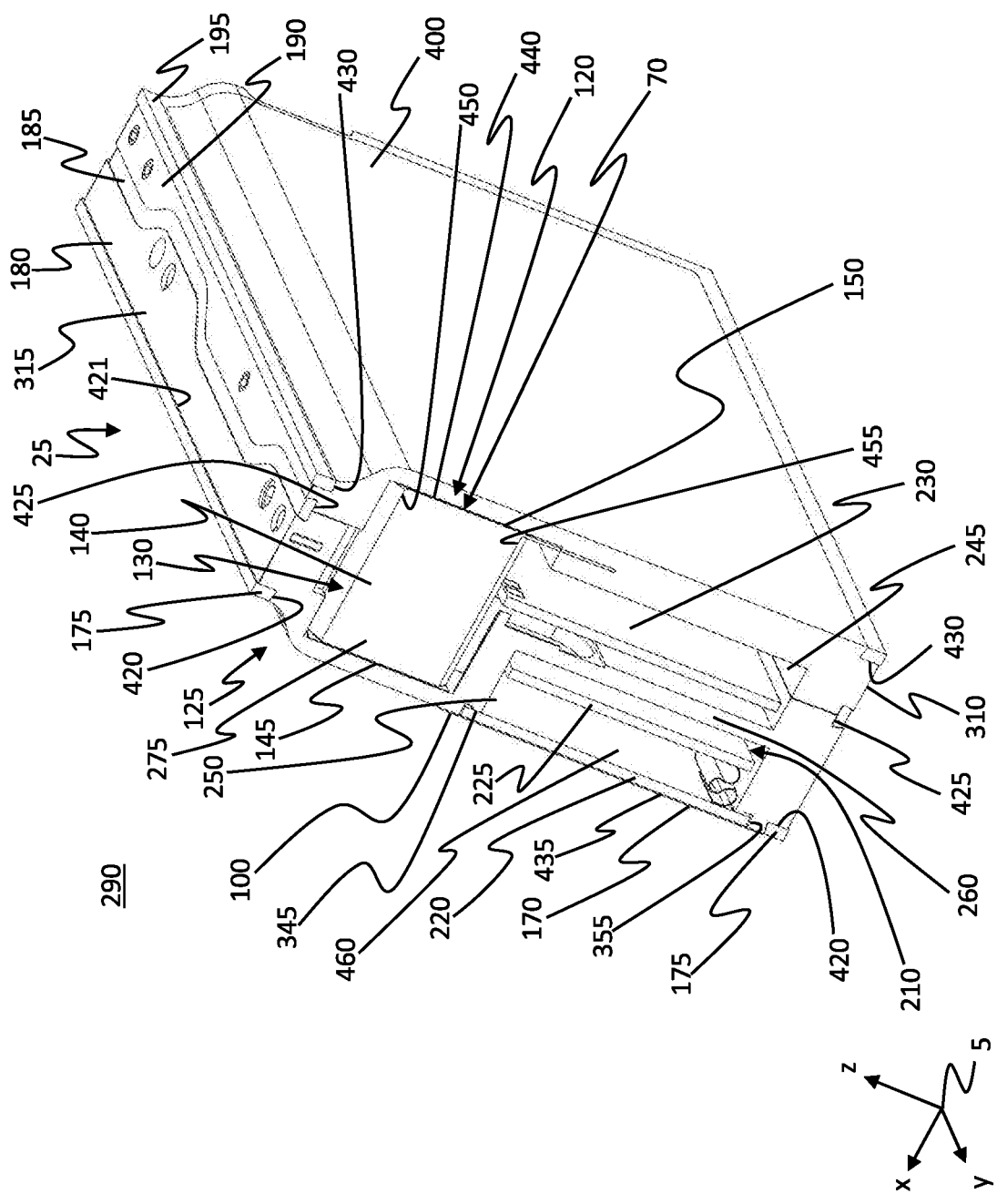
FIG. 12 shows a perspective sectional view along a sectional plane A-A, shown in FIG. 11, through the first drive module shown in FIG. 11.

FIG. 12 shows a perspective sectional view along a sectional plane A-A, shown in FIG. 11, through the first drive module 25 shown in FIG. 11. The sectional plane A-A is formed as an xz-plane.

It may be particularly advantageous when the housing 125 is of smooth design on the outer side. Here, smooth is understood to mean that the housing 125 is of substantially step-free design and is free of undercuts and/or joints on the outer side. Furthermore, it may be advantageous when the housing 125 has a mean roughness value Ra on the outer side, wherein the mean roughness value Ra lies in a range of 0.2 µm to 0.8 µm, in particular in a range of 0.4 µm to 0.8 µm. The first outer side 100 and the second outer side 400 are predominantly of planar design, in an example at least 75% of the surface area of the outer side 100, 400 is of planar design. Sticking to and/or contamination of the housing 125 on the outer side is reliably avoided in this way.

The first housing shell 180 has a first sealing groove 420 at the periphery. The first sealing groove 420 is designed to substantially follow all housing side sections 310, 315. The first sealing element 175 is arranged in the first sealing groove 420. The first sealing element 175 is of encircling design, so that reliable sealing-off can be ensured at all four housing side sections 310, 315. Ingress of media into a gap 421 between the first drive module 25 and a further component of the linear transport system 10 that is arranged on the first drive module 25, for example the running rail and/or the second drive module and/or the machine bed and/or a further first drive module, can be avoided in this way.

Furthermore, the first housing shell 180 and the second housing shell 190 have a second sealing groove 425 on a side facing the respectively other housing shell 180, 190, wherein the second sealing groove 425 is arranged in the z-direction in sections in the first housing shell 180 and in the second housing shell 190. The second sealing element 185 is arranged in the second sealing groove 425 in order to fluidically seal off the housing interior 245, 250 from the surrounding area 290.

The second housing shell 190 further has a third sealing groove 430 toward the second outer side 400 on a side averted from the first housing shell 180. In the embodiment, the third sealing groove 430 is of encircling design so as to follow all housing side sections 310, 315. The third sealing element 195 of encircling design is arranged in the third sealing groove 430 in order to seal off the gap 421 on the first drive module 25 at all four housing side sections 310, 315.

It may be particularly advantageous here when the first sealing element 175 and/or the second sealing element 185 and/or the third sealing element 195 have/has at least one of the following third materials: fluoroketone, fluorocarbon, rubber, fluoroelastomer, pigments which are designed that the sealing element 175, 185, 195, 200 reflects light waves from a blue color spectrum.

In the embodiment, the sensor printed circuit board 220 and the sensor are arranged so as to directly adjoin the covering element 170. The sensor printed circuit board 220 may be cohesively fastened to the inner side of the covering element 170 by way of the adhesive layer 435 by way of which the covering element 170 is surface-to-surface bonded to the first outer side 100. As a result, a distance of the sensor from the signal influencer of the conveying device is particularly small. Furthermore, reliable transmission of the signal from the signal influencer to the sensor through the covering element 170 is ensured owing to the thin-walled configuration of the covering element 170.

On the rear side in relation to the covering element 170, the sensor printed circuit board 220 is situated on the first bearing surface 345 and on a first side and on the second bearing face 355 on a second side, so that, on the rear side, the sensor printed circuit board 220 are reliably positioned in the second housing interior 250.

The processing unit 225 of the sensor unit 210 is arranged between the sensor printed circuit board 220 and the first housing section 260 of the first housing shell 180. The processing unit 225 is fastened to the first housing section 260.

The driver unit 230 is arranged in the first housing interior 245 between the second housing shell 190 and the first housing section 260 in the transverse direction. The driver unit 230 is fastened to the first housing section 260 of the first housing shell 180.

The coil arrangement 70 extends in the longitudinal direction of the housing 125. Here, the stator tooth 140 and the further stator tooth are arranged transversely (so as to run in the x-direction) in the first housing interior 125. The outer side 100, 400 is oriented parallel in relation to the end face 145, 150 of the stator tooth 140 and perpendicularly in relation to the stator tooth.

In order to prevent slipping of the coil arrangement 70 in the housing 125, the second housing shell 190 additionally has a second coil receptacle 440 which is arranged on a side facing the first housing interior 245. The second coil receptacle 440 has a second coil receptacle base 445, a second coil receptacle side face 450 and a second coil receptacle opening 455. The second coil receptacle 440 is of identical design to the first coil receptacle 270, and therefore the second coil receptacle side face 450 tapers from the second coil receptacle opening 455 toward the second coil receiving base 445. The second coil receptacle base 445 delimits the first housing interior 245 toward the second outer side 400 and seals off the first housing interior 245 from the surrounding area 290.

Here, it may be particularly advantageous when the wall thickness of the coil receptacle base 275, 445 to the first outer side 100, 400 is particularly small. It may be particularly advantageous when, here, the wall thickness at the coil receptacle base 275, 445 lies in a range of 100 µm to 500 µm, advantageously in a range of 250 µm to 350 µm. This reliably ensures that the traveling field 120 exits and the traveling field 120 acts on the magnet arrangement of the conveying device. In particular, a distance between the magnet arrangement and the coil arrangement 70 is kept particularly small.

It may be further advantageous when the first end side 145 of the stator tooth 140 bears against the first coil receptacle base 275 and the stator tooth 140 engages into the second coil receptacle 440 in such a way that the second end side 150 of the stator tooth 140 bears against the second coil receptacle base 445. Tilting of the coil 130 in the first housing interior 245 is reliably avoided in this way and furthermore the installation space requirement in the transverse direction for the first drive module 25 can be kept particularly low at the same time.

Particularly stable fastening of the coils 130 in the housing 125 is ensured when in each case one first coil receptacle 270 and one second coil receptacle 440 are provided for each coil 130, in some examples, for each stator tooth 140. This may be advantageous particularly when the further stator tooth is of identical design to the stator tooth 140 and in each case the stator tooth 140 and the further stator tooth 155 are provided for each coil 130.

It may be particularly advantageous when the first housing interior 245 and/or the second housing interior 250 are/is substantially completely filled with a potting compound 460. The potting compound 460 may be of thermally conductive design, and therefore heat can be reliably dissipated from the coil arrangement 70 by the potting compound 460 and the coil arrangement 70 is cooled in this way. As a result, overheating of the coil arrangement 70, in particular of the coils 135, is reliably avoided. It may be particularly advantageous when the potting compound 460 comprises a plastic, in particular a thermoset plastic, in particular a polyurethane. Furthermore, the potting compound 460 fixes the components which are arranged in the housing interior 245, 250, in particular the driver unit 230 and the sensor unit 210.

Furthermore, detaching of the housing shells 180, 190 from one another is avoided. The potting compound 460 furthermore prevents the ingress of liquids and therefore damage to electrical and/or electronic components of the sensor unit 210 and of the driver unit 230.

If the potting compound 460 is filled into the housing interior 245, 250, the potting compound 460 passes from one housing interior, for example the second housing interior 250, via the second cutout 255, into the first housing interior 245, and therefore both housing interiors 245, 250 are reliably filled with the potting compound 460 even when the potting compound 460 is only filled into one of the two housing interiors 245, 250.

During assembly of the first drive module 25, the coil arrangement 70, the sensor unit 210 and the driver unit 230 are mounted in the first housing shell 180 in a first assembly step. As a result, all tolerance chains of the first drive module 25 can be based on the first housing shell 180. The tolerance chains are also kept short by the reference to the first housing shell 180, so that the first drive module 25 has a high degree of precision.

In a second assembly step, the second housing shell 190 is fastened to the first housing shell 180 and the first housing interior 245 is closed in this way after mounting of the components on the first housing shell 180.

In a third assembly step, the potting compound 460 is introduced into the second housing interior 250. The potting compound 460 flows via the second cutout 255 into the first housing interior 245.

In a fourth assembly step, after at least partial curing of the potting compound, the covering element 170 is fitted and the housing 125 is completely closed in this way.

Figure 13:
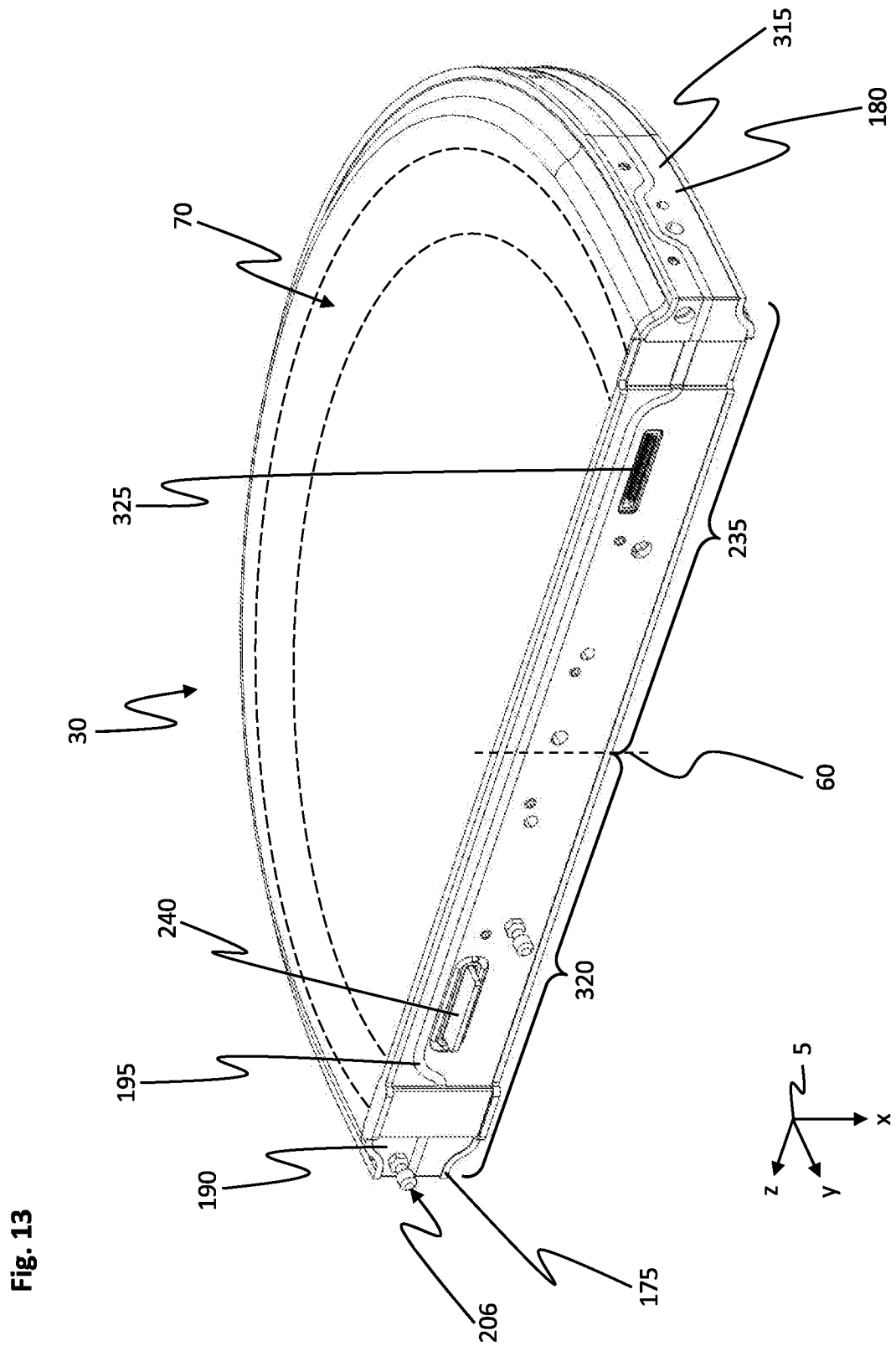
FIGS. 13 and 14 show a perspective illustrations of the second drive module.

FIG. 13 shows a perspective illustration of the second drive module 30.

The second drive module 30 is of substantially identical design to the first drive module. In contrast thereto, the second drive module 30 is designed so as to run in an arcuate manner around a center axis 60. As a result, the second housing side section can be dispensed with. The first housing side section 310 is arranged on the outer side of the second drive module 30 and is arranged so as to run on a circular path around the center axis 60. Here, the first housing side section 310 encloses an angle of 180°. It goes without saying that the first housing side section 310 and/or the second drive module 30 can enclose a different angle. The arcuate shape can also be designed differently to the manner shown. By way of example, the arcuate shape can be a clothoid.

The third and fourth housing side section 320, 335 are arranged in a common xz-plane. The first drive module can be fastened to the third housing side section 320 by way of the third housing side section 320 by the second connector 206 which is designed as a screw-in bolt in the embodiment. A further first drive module, by way of its third housing side section, can be fastened to the fourth housing side section 335 of the second drive module 30 by the second connector 206. Here, an electrical connection of the first drive module to the second drive module 30 is ensured by the interface 235, 240 in each case.

In a manner corresponding to the arcuate configuration so as to run concentrically around the center axis 60, the coil arrangement 70 (illustrated using dashed lines) is arranged so as to run in an arcuate manner around the center axis 60.

Figure 14:
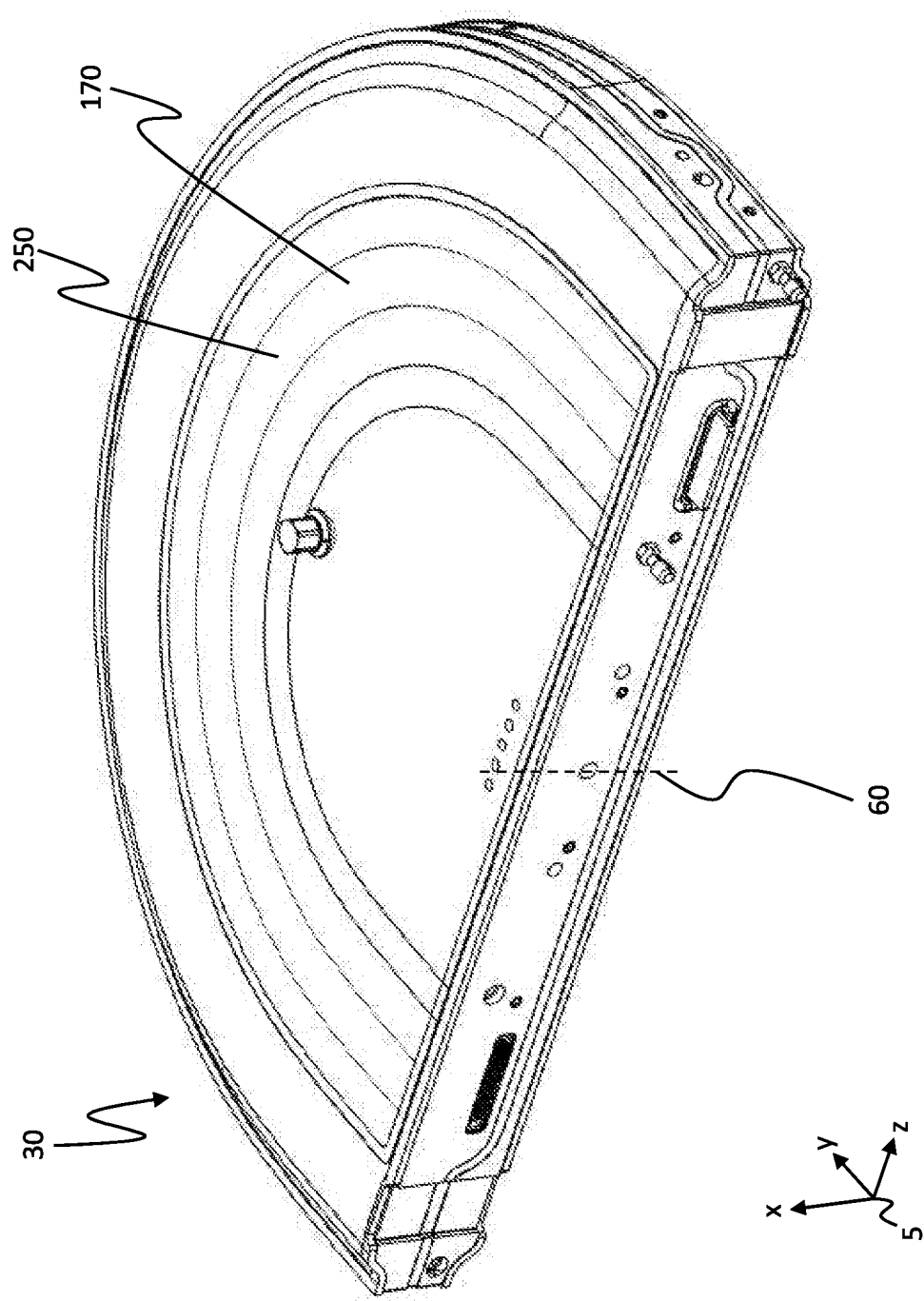

FIG. 14 shows a perspective illustration of the second drive module 30.

The covering element 170 is of arcuate configuration and closes the second housing interior 250.

Figure 15:
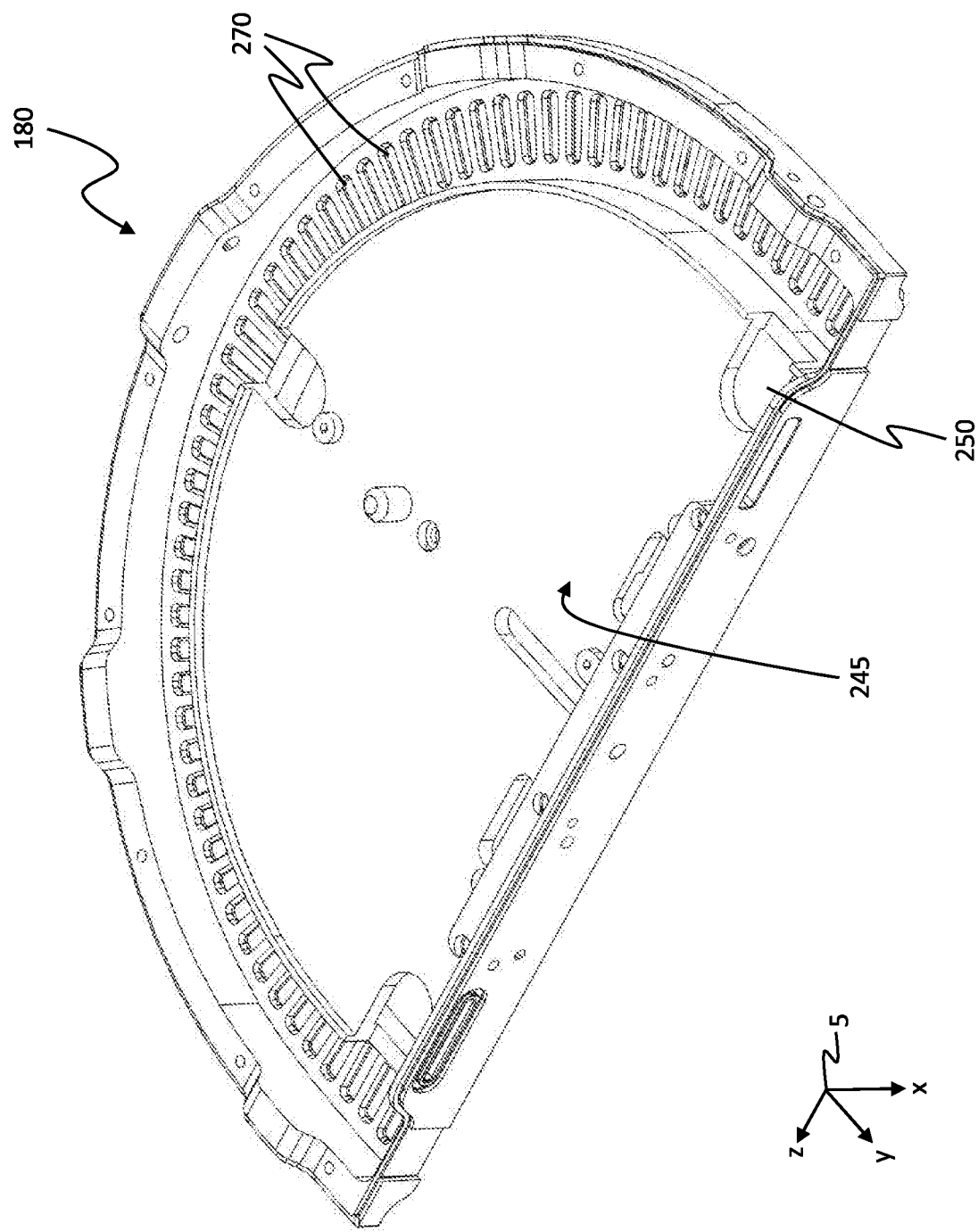
FIG. 15 shows a perspective illustration of a first housing shell of the second drive module.

FIG. 15 shows a perspective illustration of the first housing shell 180 of the second drive module 30.

The first housing shell 180 of the second drive module 30 is of substantially identical design to the first housing shell 180 of the first drive module 25. In contrast thereto, the first housing interior 245 and the second housing interior 250 are arranged in a semicircular manner with respect to the center axis 60. The first coil receptacles 270 are arranged on a circular path around the center axis 60.

Owing to the configuration of the linear transport system 10 described in the figures, the drive module 25, 30 is of smooth design on the outer side and the drive module 25, 30 can be easily cleaned. Furthermore, accumulation or ingress of impurities into the drive module 25, 30 is avoided.

Ingress of dirt or moisture into the interface 235, 240 is avoided owing to the arrangement of the interface 235, 240 in the sealed-off region between the first sealing element 175 and the third sealing element 195. Furthermore, ingress is likewise avoided at the transition between the drive module 25, 30 and the running rail 35 and also between the drive module 25, 30 and the machine bed 15. Sealing-off between the individual drive modules 25, 30 is also reliably achieved by the first and third sealing element 175, 195. Clogging of the second connector 206 is also avoided owing to the arrangement of the second connector 206 in the region between the first sealing element 175 and the third sealing element 195, so that the second connector 206 can be particularly easily released even after a long time and in a dirty surrounding area 290, so that easy disassembly of the linear transport system 10, for example for servicing work, is possible.

Owing to the linear transport system 10 being hermetically sealed off, the linear transport system 10 is suitable, in particular, for use in the food industry or the chemical industry or under conditions in which the linear transport system 10 is subjected to high levels of soiling.

Furthermore, a tolerance chain within the linear transport system 10 is kept short owing to the above-described configuration, and therefore the linear transport system 10 has a particularly high degree of precision and can be easily assembled.

Corrosion of the coils 130, in particular of the soft-magnetic material of the stator tooth 140, 155, in particular onset of rusting, is avoided owing to the arrangement of the coil arrangement 70 on the inner side in the first housing interior 245.

This invention is been described with respect to exemplary embodiments. It is understood that changes can be made and equivalents can be substituted to adapt these disclosures to different materials and situations, while remaining with the scope of the invention. The invention is thus not limited to the particular examples that are disclosed, but encompasses all the embodiments that fall within the scope of the claims.

TABLE OF REFERENCES

| | |
|---|---|
| 10 | Transport system |
| 15 | Machine bed |
| 20 | Conveying devices |
| 25 | First drive module |
| 30 | Second drive module |
| 35 | Running rail |
| 40 | Controller |
| 45 | Drive device |
| 50 | First running rail section |
| 55 | Second running rail section |
| 60 | Center axis |
| 65 | Stator |
| 70 | Coil arrangement |
| 75 | Support |
| 80 | Magnet arrangement |
| 85 | Guide arrangement |
| 90 | Position detection device |
| 95 | Signal transmitter |
| 100 | First outer side |
| 105 | First magnet arrangement section |
| 115 | Running roller |
| 120 | Traveling field |
| 125 | Housing |
| 130 | Coil |
| 135 | Winding |
| 140 | Coil core |
| 145 | First end face |
| 150 | Second end face |
| 155 | Further coil core |
| 160 | Insulation |
| 165 | First cutout |
| 170 | Covering element |
| 175 | First sealing element |
| 180 | First housing shell |
| 185 | Second sealing element |
| 190 | Second housing shell |
| 195 | Third sealing element |
| 200 | Fourth sealing element |
| 205 | First connector |
| 206 | Second connector |
| 210 | Sensor unit |
| 215 | Sensor |
| 220 | Sensor printed circuit board |
| 225 | Processing unit |
| 230 | Driver unit |
| 235 | First interface |
| 240 | Second interface |
| 245 | First housing interior |
| 250 | Second housing interior |
| 255 | Second cutout |
| 260 | First housing section |

TABLE OF REFERENCES-continued

| | |
|---|---|
| 265 | Second housing section |
| 270 | First coil receptacle |
| 275 | First coil receptacle base |
| 280 | First coil receptacle side face |
| 285 | First coil receptacle opening |
| 290 | Surrounding area |
| 305 | Third housing section |
| 310 | First housing side section |
| 315 | Second housing side section |
| 320 | Third housing side section |
| 325 | Groove |
| 330 | Third cutout |
| 335 | Fourth housing side section |
| 340 | First shoulder |
| 345 | First bearing face |
| 350 | Second shoulder |
| 355 | Second bearing face |
| 360 | Further groove |
| 365 | Fourth cutout |
| 370 | Fifth cutout |
| 375 | First connecting profile |
| 376 | Second connecting profile |
| 380 | First protrusion |
| 381 | Third protrusion |
| 385 | First receptacle |
| 386 | Second receptacle |
| 390 | Second protrusion |
| 391 | Plane of symmetry |
| 395 | Cover section |
| 400 | Second outer side |
| 405 | Receptacle |
| 415 | Threaded bore |
| 416 | First bushing |
| 420 | First sealing groove |
| 421 | Gap |
| 425 | Second sealing groove |
| 430 | Third sealing groove |
| 435 | Adhesive layer |
| 440 | Second coil receptacle |
| 445 | Second coil receptacle base |
| 450 | Second coil receptacle side face |
| 455 | Second coil receptacle opening |
| 460 | Potting compound |
| x | Vertical direction |
| y | Longitudinal direction |
| z | Transverse direction |

What is claimed is:

1. A drive module for a linear transport system, having a housing and a stator, wherein a conveying device of the linear transport system with a magnet arrangement can be arranged on the housing, wherein the housing comprises a first housing shell and a second housing shell, wherein the first housing shell and the second housing shell together delimit a first housing interior, wherein the stator is arranged in the first housing interior, wherein the stator comprises at least one coil arrangement having at least one coil with at least one stator tooth, wherein the coil arrangement is designed to switchably provide a magnetic traveling field, wherein the stator tooth has a first end face and a second end face which is arranged opposite the first end face, wherein the first end face is arranged on an inner side of the first housing shell and the second end face is arranged on an inner side of the second housing shell, wherein the housing shells cover the stator tooth in relation to a surrounding area, and wherein the magnetic traveling field exits from the coil arrangement at the end faces and passes through the housing shells in order to enter into operative connection with the magnet arrangement of the conveying device of the linear transport system on an outer side of the housing for the purpose of forming a magnetic coupling.

2. The drive module as claimed in claim 1,
wherein the first housing shell has a first outer side and the second housing shell has a second outer side,
wherein the first outer side and/or the second outer side are of substantially smooth design,
wherein the housing has a mean roughness value on the outer side, and
wherein the mean roughness value lies in a range of 0.2 μm to 0.8 μm, in particular in a range of 0.4 μm to 0.8 μm.

3. The drive module as claimed in claim 1,
wherein the first housing shell has a first outer side and the second housing shell has a second outer side,
wherein the first outer side is arranged in the region of the coil arrangement, and
wherein the first outer side is of substantially planar design.

4. The drive module as claimed in claim 1,
wherein the first housing shell has a first outer side and the second housing shell has a second outer side,
wherein the first housing shell has a first coil receptacle,
wherein the first coil receptacle has a first coil receptacle base,
wherein the first coil receptacle base is arranged between the first outer side and the first end side of the stator tooth and separates the first housing interior from the surrounding area,
wherein the first coil receptacle is designed at least in sections in a manner corresponding to the coil, in particular to the stator tooth,
wherein the coil, in particular the stator tooth, engages into the first coil receptacle and bears against the first coil receptacle base by way of the first end face,
wherein the second housing shell has a second coil receptacle which is arranged opposite the first coil receptacle,
wherein the second coil receptacle has a second coil receptacle base,
wherein the second coil receptacle base is arranged between the second outer side and the second end side of the stator tooth and separates the first housing interior from the surrounding area,
wherein the second coil receptacle is designed at least in sections so as to correspond to the stator tooth of the coil, and
wherein the coil, in particular the stator tooth, engages into the second coil receptacle and bears against the second coil receptacle base by way of the second end face.

5. The drive module as claimed in claim 4,
wherein at least one of the two coil receptacles has a coil receptacle side face and a coil receptacle opening, and
wherein the coil receptacle side face is designed at least in sections so as to taper from the coil receptacle opening toward the coil receptacle base.

6. The drive module as claimed in claim 5, wherein the first coil receptacle and the second coil receptacle are in each case provided for each coil, in particular for each stator tooth.

7. The drive module as claimed in claim 4,
wherein the coil comprises a winding around the stator tooth and an electrical insulation,
wherein the insulation is of plate-like design and has at least one first cutout,
wherein the first cutout is designed so as to correspond to the stator tooth,
wherein the stator tooth passes through the first cutout, and
wherein the insulation is arranged at least between one of the two housing shells and the winding and the winding is electrically insulated from the housing.

8. The drive module as claimed in claim 1,
having a sensor unit for ascertaining a position of the conveying device on the drive module,
wherein the first housing shell, on a side averted from the first housing interior, delimits a second housing interior at least in sections, and
wherein the sensor unit is arranged in the second housing interior.

9. The drive module as claimed in claim 8,
wherein the housing comprises a covering element and the sensor unit comprises a sensor,
wherein the covering element is arranged on a first outer side of the first housing shell and closes the second housing interior in relation to the surrounding area,
wherein the sensor is arranged so as to adjoin the covering element,
wherein the covering element is of film-like design, and
wherein the covering element is surface-to-surface bonded to the first outer side.

10. The drive module as claimed in claim 1,
wherein the first housing interior is filled with a potting compound,
wherein the potting compound is of thermally conductive design in order to dissipate heat from the stator and to cool the stator, and
wherein the potting compound has a plastic, in particular a thermoset plastic, in particular polyurethane.

11. The drive module as claimed in claim 1,
wherein the housing has an at least one first connecting profile and one second connecting profile for positioning the second housing shell relative to the first housing shell,
wherein the first connecting profile is arranged on one housing shell and the second connecting profile is arranged on the other housing shell,
wherein the first connecting profile has at least one protrusion and the second connecting profile has a receptacle which is designed so as to correspond to the protrusion,
wherein the protrusion extends in the direction of the other housing shell, and
wherein the protrusion engages into the receptacle and defines a position of the second housing shell relative to the first housing shell at least in a first direction.

12. The drive module as claimed in claim 11,
wherein the first connecting profile has at least one further protrusion and the second connecting profile has a further receptacle which is designed so as to correspond to the further protrusion,
wherein the further protrusion is arranged on one housing shell and the further receptacle is arranged on the other housing shell,
wherein the further protrusion extends in the direction of the other housing shell,
wherein the protrusion and the further protrusion are designed differently from one another,
wherein the receptacle and the further receptacle are designed differently from one another, wherein the receptacle and the protrusion are arranged on a housing side section of the housing, wherein the further receptacle and the further protrusion are arranged on a further housing side section of the housing, wherein the housing side section and the further housing side section adjoin one another, and wherein the further protrusion engages into the further receptacle and defines a position of the second housing shell relative to the first housing shell at least in a second direction transversely to the first direction.

13. The drive module as claimed in claim 11, wherein a connector is provided, wherein the connector is arranged on the protrusion, and wherein the connector is arranged centrally with respect to a maximum extent (h) of a housing side section of the housing that faces a component of the linear transport system.

14. The drive module as claimed in claim 1, wherein the housing has a sealing element, wherein the sealing element is arranged in an encircling manner on the housing, and wherein the sealing element is designed to seal off a gap between the drive module and a further component, in particular a further drive module of the linear transport system.

15. A linear transport system, having a drive module, at least one conveying device and a running rail, wherein the drive module having a housing and a stator, wherein the conveying device system with a magnet arrangement is arranged on the housing, wherein the stator is located in the housing, wherein the stator comprises at least one coil arrangement having at least one coil with at least one stator tooth, wherein a magnetic traveling field exits from the coil arrangement at end faces thereof and passes through first and second housing shells of the housing in order to enter into operative connection with the magnet arrangement of the conveying device of the linear transport system on an outer side of the housing for the purpose of forming a magnetic coupling, wherein the running rail is fastened to the drive module, wherein the conveying device comprises a guide arrangement having at least one running roller and at least one magnet arrangement which is arranged offset in relation to the running roller, and wherein the running roller bears against the running rail for the purpose of guiding the conveying device along the running rail.

16. The linear transport system as claimed in claim 15, wherein the conveying device comprises a signal influencer, wherein the signal influencer is arranged on the outer side of a covering element of the housing and is designed to provide a signal to a sensor, wherein the sensor is designed to detect the signal and to provide it to a processing unit, and wherein the processing unit is designed to ascertain a position of the conveying device on the drive module on the basis of the provided signal.

17. The linear transport system as claimed in claim 15, having a further drive module, and wherein a further stator tooth is arranged between the housings of the drive modules, wherein the further stator tooth is arranged in a groove space which is formed in mutually adjoining housing side sections of the housings.

18. The linear transport system as claimed in claim 15, having a large number of conveying devices, wherein the conveying devices are designed identically to one another, and wherein the conveying devices are driven by the drive module.

19. A drive module for a linear transport system, having a housing and a stator, wherein a conveying device of the linear transport system with a magnet arrangement can be arranged on the housing, wherein the stator is arranged in the housing, wherein the stator comprises at least one coil arrangement having at least one coil with at least one stator tooth, wherein the coil arrangement is designed to switchably provide a magnetic traveling field, and wherein the magnetic traveling field exits from the coil arrangement at end faces thereof and passes through first and second housing shells of the housing in order to enter into operative connection with the magnet arrangement of the conveying device of the linear transport system on an outer side of the housing for the purpose of forming a magnetic coupling.

* * * * *